(12) United States Patent
Tabata et al.

(10) Patent No.: US 7,396,308 B2
(45) Date of Patent: Jul. 8, 2008

(54) VEHICULAR DRIVE SYSTEM

(75) Inventors: Atsushi Tabata, Okazaki (JP); Ryuji Ibaraki, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 120 days.

(21) Appl. No.: 11/300,501

(22) Filed: Dec. 15, 2005

(65) Prior Publication Data

US 2006/0166778 A1    Jul. 27, 2006

(30) Foreign Application Priority Data

Dec. 21, 2004  (JP)  ............ 2004-370038

(51) Int. Cl.
*F16H 57/04* (2006.01)
(52) U.S. Cl. ............... 475/159; 475/160
(58) Field of Classification Search .......... 475/159, 475/160; 290/1 R; 184/6.12
See application file for complete search history.

(56) References Cited

U.S. PATENT DOCUMENTS 6,155,364 A * 12/2000 Nagano et al. ............ 180/65.2

6,740,002 B1 * 5/2004 Stridsberg ................ 477/14
7,247,112 B2 * 7/2007 Foster et al. ............... 475/5

FOREIGN PATENT DOCUMENTS

JP        7-76229       3/1995
JP      2004-116735    4/2004

* cited by examiner

*Primary Examiner*—Tisha D Lewis
(74) *Attorney, Agent, or Firm*—Oblon, Spivak, McClelland, Maier & Neustadt, P.C.

(57) ABSTRACT

A vehicular drive system including a first electric motor, a differential mechanism operable to distribute an output of a drive power source to the first electric motor and a power transmitting member, a second electric motor disposed in a power transmitting path between the power transmitting member and a drive wheel, and a power transmitting device disposed between the second electric motor and the drive wheel, wherein the first electric motor, the differential mechanism, the second electric motor and the power transmitting device are arranged in an axial direction of the vehicular drive system, the vehicular drive system being characterized by a support wall disposed between the second electric motor and the power transmitting device and arranged to support the second electric motor, and a first group of oil passages which are formed through the support wall and through which a lubricating oil is supplied to at least one of the first electric motor, the differential mechanism and the second electric motor, and to the power transmitting device.

16 Claims, 11 Drawing Sheets

| | C0 | C1 | C2 | B0 | B1 | B2 | B3 | SPEED RATIO | STEPPING RATIO |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | SPREAD 4.76 |
| N | ○ | | | | | | | | |

○ ENGAGED
◎ ENGAGED FOR STEP-VARIABLE SHIFTING, AND RELEASED FOR CONTINUOUSLY-VARIABLE SHIFTING

VEHICULAR DRIVE SYSTEM

The present application is based on Japanese Patent Application No. 2004-370038 filed on December 21, the content of which is incorporated herein by reference.

TECHNICAL FIELD

1. Field of the Invention

The present invention relates to a vehicular drive system, and more particularly to techniques for simplifying an arrangement of hydraulic passages for the vehicular drive system.

2. Description of Prior Art

There is known a vehicular drive system including a first electric motor, a second electric motor, and a torque synthesizing and distributing mechanism which is disposed between those two electric motors and which utilizes a differential function of a planetary gear set. Examples of this type of vehicular drive system include a drive system disclosed in JP-2004-116735A. Generally, a planetary gear set functioning as the above-indicated torque synthesizing and distributing mechanism, namely, as a differential mechanism, includes three rotary elements one of which is connected to the first electric motor. One of the other two rotary elements is connected to a drive power source such as an engine, while the other of those two rotary elements is connected to a power transmitting member for mechanically transmitting an output of the planetary gear set to a drive wheel. The second electric motor is disposed on the power transmitting member, or a power transmitting path between the power transmitting member and the drive wheel.

In the drive system disclosed in the above-identified publication JP-2004-116735A, the first electric motor and the second electric motor are isolated from each other by a partition wall, and the planetary gear set is disposed between the first electric motor and the partition wall. The partition wall has hydraulic passages which are commonly used for supplying a lubricating oil for the first electric motor and the planetary gear set which are disposed on the front side of the partition wall, and for the second electric motor disposed on the rear side of the partition wall. JP-7-76229A discloses prior art alternative to that of JP-2004-116735A.

The drive system including the first and second electric motors and the planetary gear set, as described above, may further include a transmission device or other power transmitting device that should also be lubricated. In this drive system, the lubricating oil is supplied from the partition wall between the first and second electric motors, to the first electric motor, second electric motor and differential mechanism, while an lubricating oil is supplied to the above-indicated power transmitting device from hydraulic passages provided in addition to the hydraulic passages formed through the partition wall, as disclosed in the above-identified publication JP-2004-116735A, whereby there is a risk of complexity in the arrangement of the lubricating hydraulic passages.

The present invention was made in view of the background art described above. It is therefore an object of this invention to provide a vehicular drive system which is simple in the arrangement of the lubricating hydraulic passages.

SUMMARY OF THE INVENTION

The object indicated above may be achieved according to the present invention, which provides a vehicular drive system including (a) a first electric motor, (b) a differential mechanism operable to distribute an output of a drive power source to the first electric motor and a power transmitting member, (c) a second electric motor disposed in a power transmitting path between the power transmitting member and a drive wheel, and (d) a power transmitting device disposed between the second electric motor and the drive wheel, the first electric motor, the differential mechanism, the second electric motor and the power transmitting device being arranged in an axial direction of the vehicular drive system, the vehicular drive system being characterized by a support wall disposed between the second electric motor and the power transmitting device and arranged to support the second electric motor, and a first group of oil passages which are formed through the support wall and through which a lubricating oil is supplied to at least one of the first electric motor, the differential mechanism and the second electric motor, and to the power transmitting device.

In the drive system according to the present invention, the lubricating oil is supplied from the support wall between the second electric motor and the power transmitting device, to the devices on the opposite axial sides of the support wall. Accordingly, the arrangement of the lubricating oil passages can be made simpler in the present drive system, than in a drive system wherein two groups of lubricating oil passages are provided for the respective two groups of devices disposed on the respective opposite axial sides of the support wall.

Preferably, an input shaft of said power transmitting device extends through a rotor of the second electric motor in an axial direction of the rotor and is fitted to an input shaft of the differential mechanism, and the input shaft of the power transmitting device has a second group of oil passages to which the lubricating oil is supplied from the first group of oil passages, while the input shaft of the differential mechanism has a third group of oil passages to which the lubricating oil is supplied from the second group of oil passages.

Preferably, the differential mechanism has a fourth groups of oil passages held in communication with the third group of oil passages formed through the input shaft of the differential mechanism.

Preferably, the power transmitting device includes a transmission.

Preferably, the first group of oil passages include an oil passage open in an inner circumferential surface of the support wall. In this case, the radial position at which the first group of oil passages is open toward the second group of oil passages is made close to the axis of the power transmitting device, and the radial position at which the second group of oil passages is open toward the first group of oil passages is made close to the axis of the input shaft of the power transmitting device, so that the diameter of sealing rings disposed adjacent to the second group of oil passages can be reduced, whereby the amount of a dragging power loss due to friction of the input shaft of the power transmitting device with respect to the sealing rings during rotation of the input shaft can be reduced.

Preferably, the second group of oil passages includes a 2-1 oil passage which extends in a radial direction of the input shaft of the power transmitting device and which is open at an axial position of the input shaft of the power transmitting device at which the first group of oil passages is open toward the 2-1 oil passage.

Preferably, the second group of oil passages includes a 2-2 oil passage which extends in an axial direction of the input shaft of the power transmitting device and which is held in communication with the 2-1 oil passage, the 2-2 oil passage being open at one end thereof in an end face of the input shaft of the power transmitting device, which end face is located on the side of the input shaft of the differential mechanism.

Preferably, the second group of oil passages includes a 2-3 oil passage which extends in an axial direction of the input shaft of the power transmitting device and which is held in communication with the 2-1 oil passage, the 2-3 oil passage being open at one end thereof in an end face of the input shaft of the power transmitting device, which end face is remote from the input shaft of the differential mechanism.

Preferably, a rotor support shaft supporting the rotor of the second electric motor, and the input shaft of the power transmitting device are fitted on each other through a spline, and the second group of oil passages includes a 2-4 oil passage which extends in the radial direction of the input shaft of the power transmitting device and which is held in communication with the 2-2 oil passage, the 2-4 oil passage being open in an axial portion of an outer circumferential surface of the input shaft of the power transmitting device in which the spline is formed.

Preferably, a bearing is interposed between a rotor support shaft supporting the rotor of the second electric motor, and the input shaft of the power transmitting device, and the second group of oil passages includes a 2-5 oil passage which extends in the radial direction of the input shaft of the power transmitting device and which is held in communication with the 2-2 oil passage, the 2-5 oil passage being open in an axial portion of an outer circumferential surface of the input shaft of the power transmitting device at which the bearing is located.

Preferably, the second group of oil passages includes a 2-6 oil passage which is located radially inwardly of the differential mechanism and which extends in the radial direction of the input shaft of the power transmitting device, the 2-6 oil passage being held in communication with the 2-2 oil passage.

Preferably, the third group of oil passages includes a 3-1 oil passage which extends in an axial direction of the input shaft of the differential mechanism and which is open at one end thereof toward the 2-2 oil passage.

Preferably, a bearing is interposed between a rotor support shaft supporting the rotor of the second electric motor, and the input shaft of the differential mechanism, and the third group of oil passages includes a 3-2 oil passage which extends in a radial direction of the input shaft of the differential mechanism and which is held in communication with the 3-1 oil passage, the 3-2 oil passage being open in an axial portion of an outer circumferential surface of the input shaft of the differential mechanism at which the bearing is located.

Preferably, an axial end portion of the input shaft of the differential mechanism which is located on the side of the power transmitting member is formed integrally with a portion of the differential mechanism, and the third group of oil passages includes a 3-3 oil passage which is formed through the portion of the differential mechanism, so as to extend in a radial direction of the differential mechanism, the 3-3 oil passage being held in communication with the 2-6 oil passage.

Preferably, the differential mechanism includes a planetary gear set, and the fourth group of oil passages includes a 4-1 oil passage which is formed through a pinion shaft of the planetary gear set, so as to extend in a radial direction of the pinion shaft. the 4-1 oil passage being held in communication with the 3-3 oil passage, the fourth group of oil passages further including a 4-2 oil passage which is formed through the pinion shaft, so as to extend in an axial direction of the pinion shaft, the 4-2 oil passage being held in communication with the 4-1 oil passage.

DETAILED DESCRIPTION OF THE PREFERRED EMBODIMENTS

Figures 1, 2:
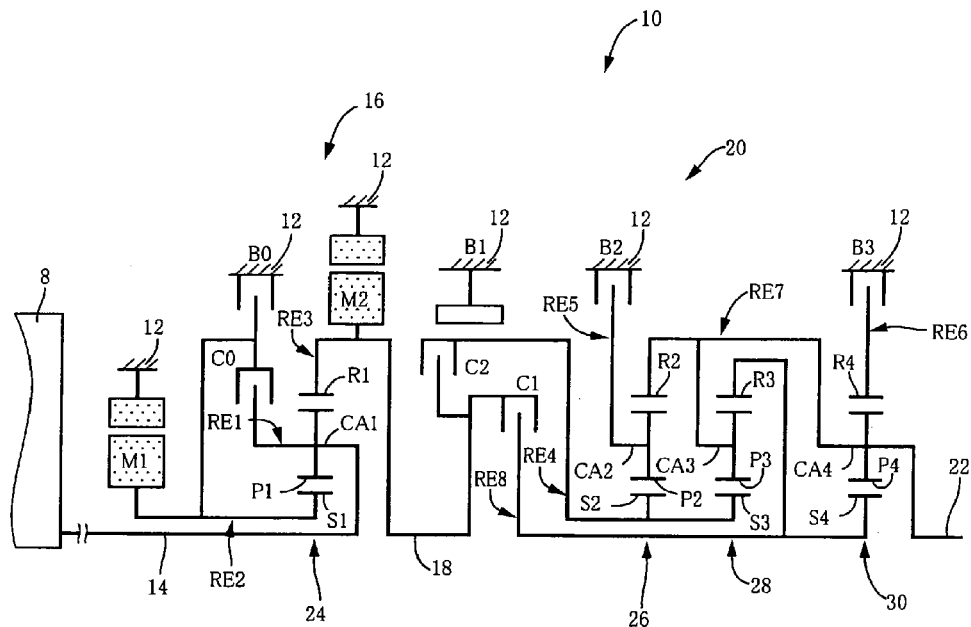
FIG. 1 is a schematic view showing an arrangement of a drive system for a hybrid vehicle, which is constructed according to one embodiment of the present invention.
FIG. 2 is a table indicating shifting actions of the drive system of the hybrid vehicle of the embodiment of FIG. 1 operable in a selected one of a continuously-variable shifting state and a step-variable shifting state, in relation to different combinations of operating states of hydraulically operated frictional coupling devices to effect the respective shifting actions.

Referring to the drawings, there will be described in detail the embodiments of the present invention.

Referring first to the schematic view of FIG. 1, there is shown a drive system 10 for a hybrid vehicle, which is constructed according to one embodiment of this invention. The drive system 10 shown in FIG. 1 includes: an input rotary member in the form of a differential mechanism input shaft 14 disposed on a common axis in a transmission casing 12 (hereinafter abbreviated as "casing 12") functioning as a stationary member or non-rotary member attached to a body of the vehicle; a power distributing mechanism 16 connected to this differential mechanism input shaft 14 either directly, or indirectly via a pulsation absorbing damper (vibration damping device) not shown; a power transmitting device in the form of a step variable automatic transmission 20 disposed between the power distributing mechanism 16 and a drive system output shaft 22, such that the automatic transmission 20 is connected in series to the power distributing mechanism 16 through a power transmitting member 18; and an output rotary member in the form of the drive system output shaft 22 connected to the automatic transmission 20.

Figure 7:
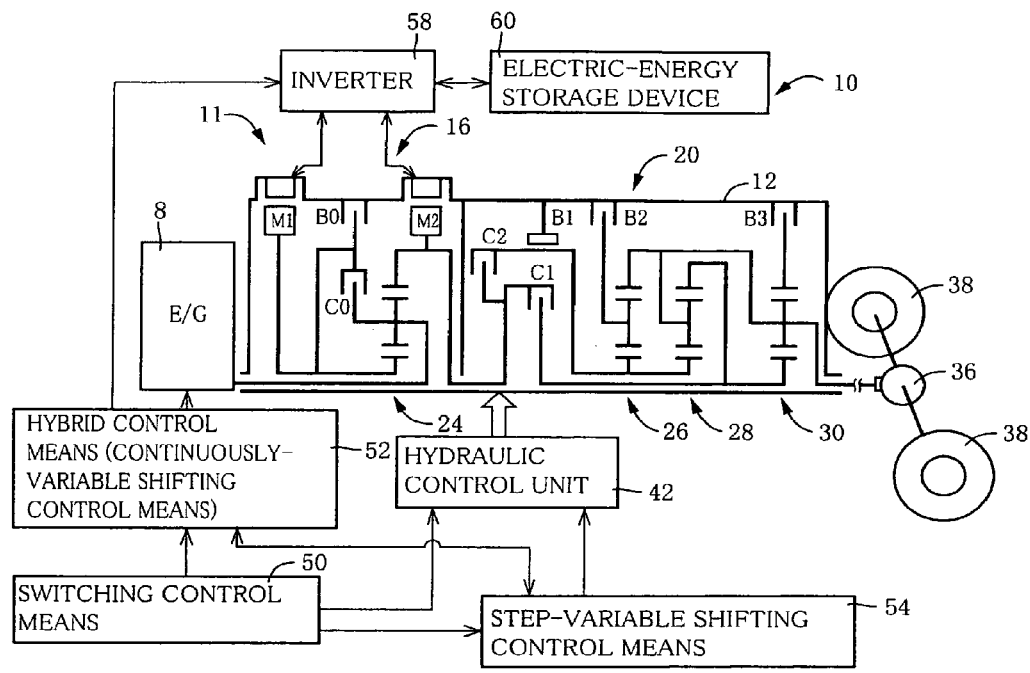
FIG. 7 is a functional block diagram illustrating major control functions performed by the electronic control device of FIG. 6.

This drive system 10 is suitably used for a transverse FR vehicle (front-engine, rear-drive vehicle), and is disposed between a drive power source in the form of an engine 8 and a pair of drive wheels 38, to transmit a vehicle drive force to the pair of drive wheels 38 through a differential gear device (final speed reduction gear) 36 and a pair of drive axles, as shown in FIG. 7. It is noted that a lower half of the drive system 10, which is constructed symmetrically with respect to its axis, is omitted in FIG. 1.

The differential mechanism input shaft 14 is connected at its one end to the engine 8, and the power distributing mechanism 16 is a mechanism arranged to mechanically synthesize an output of the engine 8 received from the differential mechanism input shaft 14, or to mechanically distribute the output of the engine 8. That is, the power distributing mechanism 16 distributes the output of the engine 8 to a first electric motor M1 and the power transmitting member 18, or synthesizes the output of the engine 8 and the output of the first electric motor M1 and transmits a sum of these outputs to the power transmitting member 18. In the present embodiment, each of the first electric motor M1 and a second electric motor M2 is a so-called motor/generator functioning as an electric generator as well as an electric motor. The first electric motor M1 should function at least as an electric generator operable to generate an electric energy while generating a reaction force, and the second electric motor M2 should function at least as an electric motor operable to generate a vehicle drive force.

The power distributing mechanism 16 includes a first planetary gear set 24 of single pinion type functioning as the differential mechanism, a switching clutch C0 and a switching brake B0. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. The first planetary gear set 24 has a gear ratio $\rho 1$ of about 0.418, for example. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the differential mechanism input shaft 14, that is, to the engine 8, and the first sun gear S1 is connected to the first electric motor M1, while the first ring gear R1 is connected to the power transmitting member 18. The switching brake B0 is disposed between the first sun gear S1 and the casing 12, and the switching clutch C0 is disposed between the first sun gear S1 and the first carrier CA1. When the switching clutch C0 and brake B0 are both released, the power distributing mechanism 16 is placed in a differential state in which the first sun gear S1, first carrier CA1 and first ring gear R1 are rotatable relative to each other, so as to perform a differential function, so that the output of the engine 8 is distributed to the first electric motor M1 and the power transmitting member 18, whereby a portion of the output of the engine 8 which is distributed to the first electric motor M1 is used to drive the first electric motor M1 to generate an electric energy which is stored or used to drive the second electric motor M2. Accordingly, the power distributing mechanism 16 is placed in the continuously-variable shifting state in which the rotating speed of the power transmitting member 18 is continuously variable, irrespective of the rotating speed of the engine 8, namely, in the differential state or continuously-variable shifting state in which the power distributing mechanism 16 functions as an electrically controlled continuously variable transmission whose speed ratio $\gamma 0$ (rotating speed of the differential mechanism input shaft 14/rotating speed of the power transmitting member 18) is continuously variable from a minimum value $\gamma 0 min$ to a maximum value $\gamma 0 max$.

When the switching clutch C0 is engaged during running of the vehicle by the output of the engine 8 while the power distributing mechanism 16 is placed in the continuously-variable shifting state, the first sun gear S1 and the first carrier CA1 are connected together, so that the power distributing mechanism 16 is brought into a locked state or non-differential state in which the three rotary elements of the first planetary gear set 24 consisting of the first sun gear S1, first carrier CA1 and first ring gear R1 are rotatable as a unit. In this non-differential state in which the rotating speed of the engine 8 and the rotating speed of the power transmitting member 18 are made equal to each other, the power distributing mechanism is placed in a fixed-speed-ratio shifting state in which the power distributing mechanism 16 functions as a transmission having a fixed speed ratio $\gamma 0$ equal to 1. When the switching brake B0 is engaged in place of the switching clutch C0, the power distributing mechanism 16 is placed in the locked or non-differential state in which the first sun gear S1 is not rotatable, so that the rotating speed of the first ring gear R1 is made higher than that of the first carrier CA1, whereby the power distributing mechanism 16 is placed in the fixed-speed-ratio shifting state in which the power distributing mechanism 16 functions as a speed-increasing transmission having a fixed speed ratio $\gamma 0$ smaller than 1, for example, about 0.7. In the present embodiment described above, the switching clutch C0 and brake B0 function as a differential-state switching device operable to selectively place the first planetary gear set 24 in the differential state (continuously-variable shifting state) in which the first planetary gear set 24 functions as an electrically controlled continuously variable transmission the speed ratio of which is continuously variable, and in the non-differential state, namely, in the locked state in which the first planetary gear set 24 does not function as the electrically controlled continuously variable transmission having the continuously-variable shifting function, that is, in the fixed-speed-ratio shifting state in which the first planetary gear set 24 functions as a transmission having a single gear position with one speed ratio or a plurality of gear positions with respective speed ratios.

The automatic transmission 20 includes a plurality of planetary gear sets, that is, a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear r4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission 20, the second sun gear S2 and the third sun gear S3 are integrally fixed to each other as a unit, selectively connected to the power transmitting member 18 through a second clutch C2, and selectively fixed to the casing 12 through a first brake B1. The fourth ring gear R4 is selectively fixed to the casing 12 through a third brake B3, and the second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are superposed on each other and which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the drive system 10 constructed as described above, one of a first-gear position (first-speed position) through a fifth-gear position (fifth-speed position), a reverse-gear position (rear-drive position) and a neural position is selectively established by engaging actions of a corresponding combination of the frictional coupling devices selected from the above-described switching clutch C0, first clutch C1, second clutch C2, switching brake B0, first brake B1, second brake B2 and third brake B3, as indicated in the table of FIG. 2. Those gear positions have respective speed ratios γ (input shaft speed $N_{IN}$/output shaft speed $N_{OUT}$) which change as geometric series. In particular, it is noted that the power distributing mechanism 16 is provided with the switching clutch C0 and brake B0, so that the power distributing mechanism 16 can be selectively placed by engagement of the switching clutch C0 or switching brake B0, in the fixed-speed-ratio shifting state in which the power distributing mechanism 16 is operable as a transmission having a single gear position with one speed ratio or a plurality of gear positions with respective speed ratios, as well as in the continuously-variable shifting state in which the power distributing mechanism 16 is operable as a continuously variable transmission, as described above. In the present drive system 10, therefore, a step-variable transmission is constituted by the automatic transmission 20, and the power distributing mechanism 16 which is placed in the fixed-speed-ratio shifting state by engagement of the switching clutch C0 or switching brake B0. Further, a continuously variable transmission is constituted by the automatic transmission 20, and the power distributing mechanism 16 which is placed in the continuously-variable shifting state, with none of the switching clutch C0 and brake B0 being engaged.

Where the drive system 10 functions as the step-variable transmission, for example, the first-gear position having the highest speed ratio γ1 of about 3.357, for example, is established by engaging actions of the switching clutch C0, first clutch C1 and third brake B3, and the second-gear position having the speed ratio γ2 of about 2.180, for example, which is lower than the speed ratio γ1, is established by engaging actions of the switching clutch C0, first clutch C1 and second brake B2, as indicated in FIG. 2. Further, the third-gear position having the speed ratio γ3 of about 1.424, for example, which is lower than the speed ratio γ2, is established by engaging actions of the switching clutch C0, first clutch C1 and first brake B1, and the fourth-gear position having the speed ratio γ4 of about 1.000, for example, which is lower than the speed ratio γ3, is established by engaging actions of the switching clutch C0, first clutch C1 and second clutch C2. The fifth-gear position having the speed ratio γ5 of about 0705, for example, which is smaller than the speed ratio γ4, is established by engaging actions of the first clutch C1, second clutch C2 and switching brake B0. Further, the reverse-gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the drive system 10 functions as the continuously-variable transmission, on the other hand, the switching clutch C0 and the switching brake B0 are both released, as indicated in FIG. 2, so that the power distributing mechanism 16 functions as the continuously variable transmission, while the automatic transmission 20 connected in series to the power distributing mechanism 16 functions as the step-variable transmission, whereby the speed of the rotary motion transmitted to the automatic transmission 20 placed in one of the first-gear, second-gear, third-gear and fourth-gear positions, namely, the rotating speed of the power transmitting member 18 is continuously changed, so that the speed ratio when the automatic transmission 20 is placed in one of those gear positions is continuously variable over a predetermined range. Accordingly, the speed ratio of the automatic transmission 20 is continuously variable across the adjacent gear positions, whereby the overall speed ratio γT of the drive system 10 is continuously variable.

Figure 3:
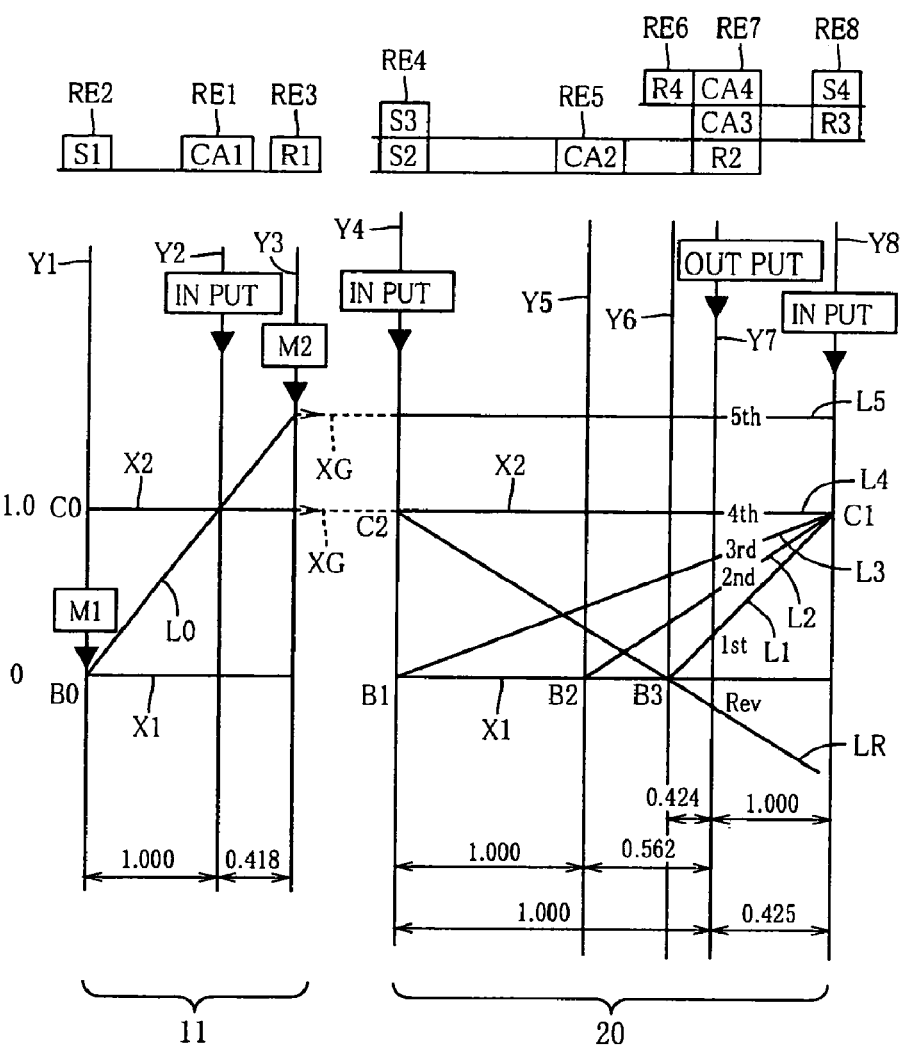
FIG. 3 is a collinear chart indicating relative rotating speeds of rotary elements of the drive system of the hybrid vehicle of the embodiment of FIG. 1 operated in the step-variable shifting state, in different gear positions of the drive system.

The collinear chart of FIG. 3 indicates, by straight lines, a relationship among the rotating speeds of the rotary elements in each of the gear positions of the drive system 10, which is constituted by the power distributing mechanism 16 functioning as the continuously-variable shifting portion or first shifting portion, and the automatic transmission 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed $N_E$ of the engine 8 connected to the input shaft 14. The horizontal line XG indicates the rotating speed of the power transmitting member 18. Three vertical lines Y1, Y2 and Y3 correspond to three elements of the power distributing mechanism 16, and respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. Therefore, as shown in FIG. 3, the distance between the vertical lines corresponding to the sun gear and carrier of each of the second, third and fourth planetary gear sets 26, 28, 30 corresponds to "1", while the distance between the vertical lines corresponding to the carrier and ring gear corresponds to the gear ratio ρ.

Referring to the collinear chart of FIG. 3, the power distributing mechanism 16 (continuously-variable transmission portion) of the drive system 10 is arranged such that the first rotary element RE1 (first carrier CA1) of the first planetary gear set 24, is integrally fixed to the input shaft 14, that is, to the engine 8, and is selectively connected to the second rotary element RE2 (first sun gear S1) through the switching clutch C0, and this rotary element RE2 is connected to the first electric motor M1 and selectively fixed to the casing 12 through the switching brake B0, while the third rotary element RE3 (first ring gear R1) is fixed to the power transmitting member 18 and connected to the second electric motor M2, so that a rotary motion of the differential mechanism input shaft 14 is transmitted to the automatic transmission (step-variable transmission portion) 20 through the power transmitting member 18. A relationship between the rotating speeds of the first sun gear S1 and the first ring gear R1 is represented by an inclined straight line L0 which passes a point of intersection between the lines Y2 and X2.

Figure 4:
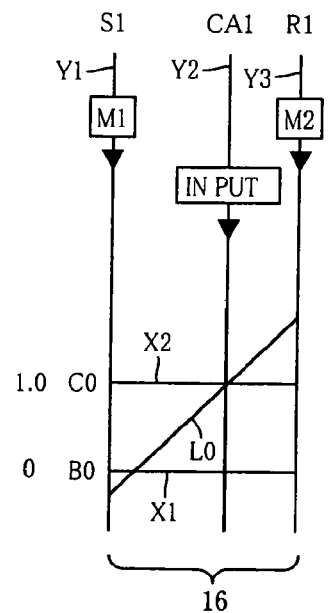
FIG. 4 is a view showing an example of an operating state of a power distributing mechanism of the drive system placed in the continuously-variable shifting state, the view corresponding to a part of the collinear chart of FIG. 3 which shows the power distributing mechanism.
Figure 5:
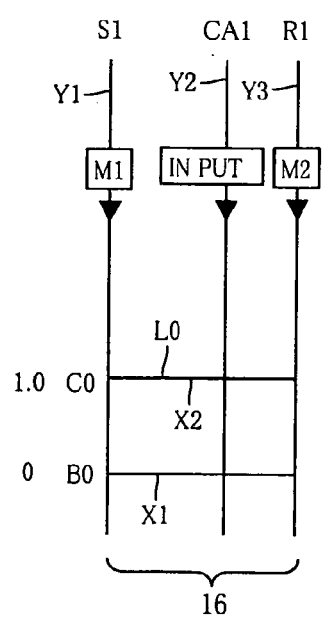
FIG. 5 is a view showing the operating state of the power distributing mechanism placed in the step-variable shifting state by engagement of a switching clutch C0, the view corresponding to the part of the collinear chart of FIG. 3 which shows the power distributing mechanism.

FIGS. 4 and 5 correspond to a part of the collinear chart of FIG. 3 which shows the power distributing mechanism 16. FIG. 4 shows an example of an operating state of the power distributing mechanism 16 placed in the continuously-variable shifting state with the switching clutch C0 and the switching brake B0 held in the released state. The rotating speed of the first sun gear S1 represented by the point of intersection between the straight line L0 and vertical line Y1 is raised or lowered by controlling the reaction force generated by an operation of the first electric motor M1 to generate an electric energy, so that the rotating speed of the first ring gear R1 represented by the point of intersection between the lines L0 and Y3 is lowered or raised. In the state shown in FIG. 4, the first sun gear S1 has a negative rotating speed, that is, the first electric motor M1 is operated with an electric power supplied thereto. In this state in which the first sun gear S1 has the negative rotating speed, the straight line L0 has a relatively large angle of inclination, so that the first ring gear R1 and the power transmitting member 18 connected to the first ring gear R1 have relatively high rotating speeds, thereby permitting the vehicle to run at a relatively high speed, but deteriorating the fuel economy of the vehicle by an amount corresponding to the amount of electric power supplied to and consumed by the first electric motor M1. In the present drive system 10, however, the automatic transmission 20 is arranged to raise the input rotating speed received from the power transmitting member 18, so that there is a relatively low opportunity in which the first sun gear S1 should have a negative rotating speed. Accordingly, the fuel economy can be improved in the present arrangement, than in the case where the automatic transmission 20 were not able to raise the rotating speed of the power transmitting member 18.

FIG. 5 shows an operating state of the power distributing mechanism 16 placed in the step-variable shifting state with the switching clutch C0 held in the engaged state. When the first sun gear S1 and the first carrier CA1 are connected to each other, the three rotary elements indicated above are rotated as a unit, so that the straight line L0 is aligned with the horizontal line X2, whereby the power transmitting member 18 is rotated at a speed equal to the engine speed $N_E$. When the switching brake B0 is engaged, on the other hand, the rotation of the first sun gear S1 is stopped, so that the straight line L0 is inclined in the state indicated in FIG. 3, whereby the rotating speed of the first ring gear R1, that is, the rotation of the power transmitting member 18 represented by a point of intersection between the lines L0 and Y3 is made higher than the engine speed $N_E$ and transmitted to the automatic transmission 20.

In the automatic transmission 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is integrally fixed to the drive system output shaft 22, while the eighth rotary element RE8 is selectively connected to the power transmitting member 18 through the first clutch C1.

When the first clutch C1 and the third brake B3 are engaged, the automatic transmission 20 is placed in the first-speed position. The rotating speed of the drive system output shaft 22 in the first-speed position is represented by a point of intersection between the vertical line Y7 indicative of the rotating speed of the seventh rotary element RE7 fixed to the drive system output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1. Similarly, the rotating speed of the drive system output shaft 22 in the second-speed position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the drive system output shaft 22. The rotating speed of the drive system output shaft 22 in the third-speed position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the drive system output shaft 22 in the fourth-speed position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the drive system output shaft 22. In the first-speed through fourth-gear positions in which the switching clutch C0 is placed in the engaged state, the eighth rotary element RE8 is rotated at the same speed as the engine speed $N_E$, with the drive force received from the power distributing mechanism 16, that is, from the power distributing mechanism 16. When the switching brake B0 is engaged in place of the switching clutch C0, the eighth rotary element RE8 is rotated at a speed higher than the engine speed $N_E$, with the drive force received from the power distributing mechanism 16. The rotating speed of the output shaft 22 in the fifth-speed position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 6:
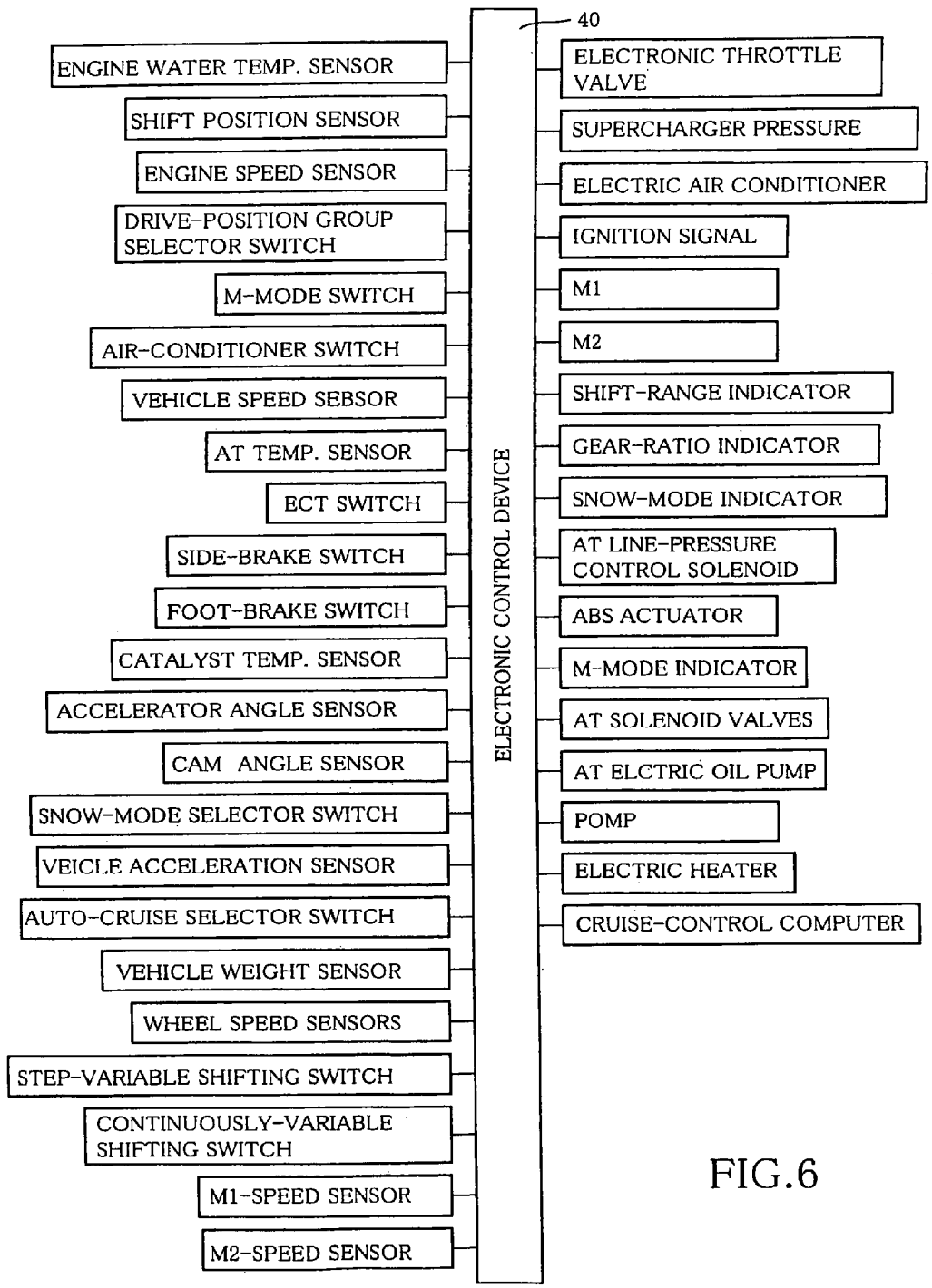
FIG. 6 is a view indicating input and output signals of an electronic control device provided in the drive system of the embodiment of FIG. 1.

FIG. 6 illustrates signals received by an electronic control device 40 provided to control the drive system 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as a shifting control of the automatic transmission 20.

The electronic control device 40 is arranged to receive, from various sensors and switches shown in FIG. 6, various signals such as: a signal indicative of a temperature of cooling water of the engine; a signal indicative of a selected operating position of a shift lever; a signal indicative of the operating speed $N_E$ of the engine 8; a signal indicative of a value indicating a selected group of forward-drive positions of the transmission mechanism; a signal indicative of an M mode (motor-drive mode); a signal indicative of an operated state of an air conditioner; a signal indicative of a vehicle speed corresponding to the rotating speed of the drive system output shaft 22; a signal indicative of a temperature of a working oil of the automatic transmission 20; a signal indicative of an operated state of a side brake; a signal indicative of an operated state of a foot brake; a signal indicative of a temperature of a catalyst; a signal indicative of an angle of operation of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the power distributing mechanism 16 in the fixed-speed-ratio shifting state in which the drive system 10 functions as a step-variable transmission; a signal indicative of a continuously-variable shifting switch provided to place the power distributing mechanism 16 in the continuously variable-shifting state in which the drive system 10 functions as the continuously variable transmission; a signal indicative of a rotating speed $N_{M1}$ of the first electric motor M1; and a signal indicative of a rotating speed $N_{M2}$ of the second electric motor M2. The electronic control device 40 is further arranged to generate various signals such as: a signal to drive an electronic throttle actuator for controlling an angle of opening of a throttle valve; a signal to adjust a pressure of a supercharger; a signal to operate the electric air conditioner; a signal for controlling an ignition timing of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of the hydraulically operated frictional coupling devices of the power distributing mechanism 16 and the automatic transmission 20; a signal to operate an electric oil pump used as a hydraulic pressure source for the hydraulic control unit 42; a signal to drive an electric heater; and a signal to be applied to a cruise-control computer.

FIG. 7 is a functional block diagram illustrating major control functions performed by the electronic control device 40. Switching control means 50 is arranged to determine whether the vehicle condition is in a continuously-variable shifting region in which the drive system 10 should be placed in the continuously-variable shifting state, or in a step-variable shifting region in which the drive system 10 should be placed in the step-variable shifting state. This determination is made on the basis of a stored predetermined relationship shown in FIG. 8 or 9, for example. Where the relationship shown in FIG. 8 (switching data map) is used, the determination is made on the basis of the vehicle condition as represented by the actual engine speed $N_E$, and a drive-force-related value relating to the drive force of the hybrid vehicle, for example, an engine output torque $T_E$.

Figure 8:
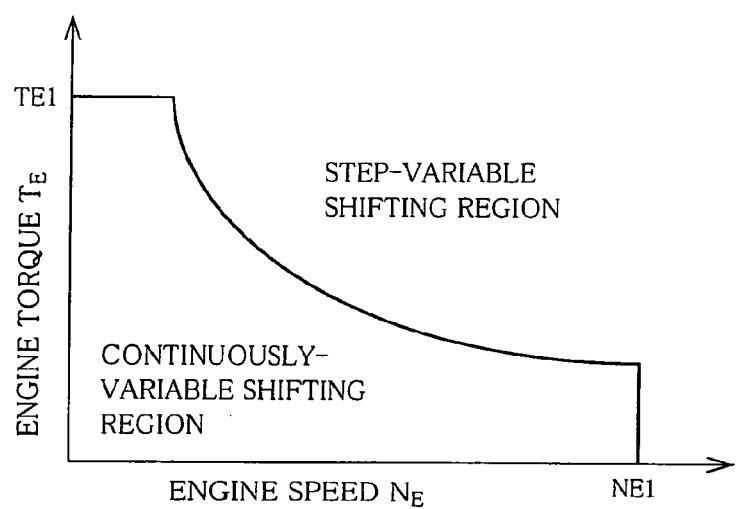
FIG. 8 is a view indicating a stored predetermined relationship used by the switching control means of FIG. 7 for switching between a continuously-variable shifting region and a step-variable shifting region.

According to the relationship shown in FIG. 8, the step-variable shifting region is set to be a high-torque region (a high-output running region in which the output torque $T_E$ of the engine 8 is not lower than a predetermined value TE1, or a high-speed region in which the engine speed $N_E$ is not lower than a predetermined value NE1, namely, a high-vehicle-speed region in which the vehicle speed which is one of the vehicle conditions and which is determined by the engine speed NE and the overall speed ratio γT is not lower than a predetermined value, or a high-output region in which the vehicle output calculated from the output torque $T_E$ and speed $N_E$ of the engine 8 is not lower than a predetermined value. Accordingly, the step-variable shifting control is effected when the vehicle is running with a comparatively high output torque or speed of the engine 8, or with a comparatively high vehicle output. The step-variable shifting control permits a change of the engine speed $N_E$ as a result of a shift-up action of the transmission, that is, a rhythmic change of the speed of the engine 8. Namely, the continuously-variable shifting state is switched to the step-variable shifting state (fixed-speed-ratio shifting state) when the vehicle is placed in a high-output running state in which a desire of the vehicle operator to increase the vehicle drive force should be satisfied rather a desired to improve the fuel economy. Accordingly, the vehicle operator can enjoy a comfortable rhythmic change of the engine speed $N_E$. On the other hand, the continuously-variable shifting control is effected when the vehicle is running with a comparatively low output torque or speed of the engine 8, or with a comparatively low vehicle output, that is, when the engine 8 is a normal output state. A boundary line defining the step-variable shifting region and the continuously-variable shifting region in FIG. 8 corresponds to a high-vehicle speed determining line defined by a series of high-vehicle-speed upper limit values, or a high-output running determining line defined by a series of high-output upper limit values.

Figure 9:
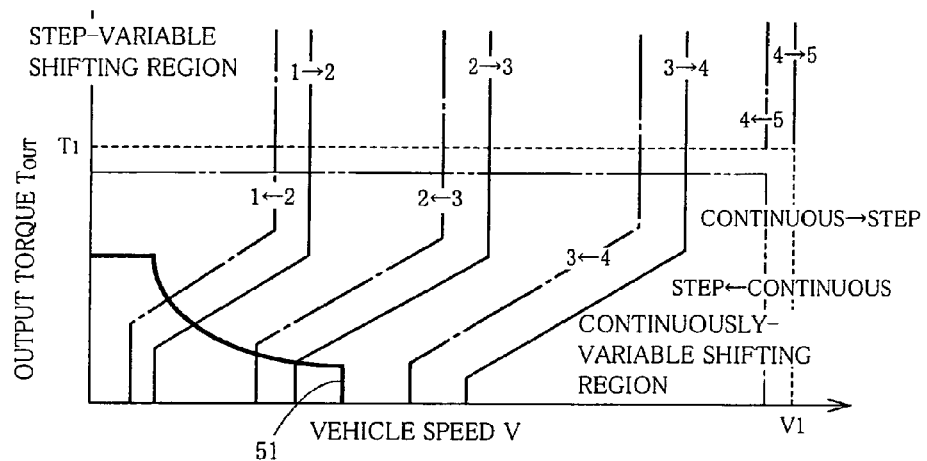
FIG. 9 is a view indicating a stored predetermined relationship used by the switching control means of FIG. 7, which is different from that of FIG. 8.

When the relationship shown in FIG. 9 is used, the above-indicated determination is made on the basis of the actual vehicle speed V and the drive-force-related value in the form of the output torque $T_{OUT}$. In FIG. 9, a broken line indicates a threshold vehicle speed V1 and a threshold output torque T1 which define a predetermined vehicle condition used for switching from the continuously-variable shifting control to the step-variable shifting control, and two-dot chain line indicates a predetermined vehicle condition used for switching from the step-variable shifting control to the continuously-variable shifting control. Thus, there is provided a hysteresis for determination as to whether the shifting state should be switched between the step-variable shifting region and the continuously-variable shifting region. In FIG. 9, a solid line 51 indicates a boundary line defining a motor drive region in which the vehicle is driven by a drive force generated by the electric motor, with a relatively low vehicle output torque or at a relatively low vehicle speed. FIG. 9 also shows a shift boundary data map which uses control parameters in the form of the vehicle speed V and the output torque $T_{OUT}$.

When the switching control means 50 determines that the vehicle condition is in the step-variable shifting region, the switching control means 50 disables a hybrid control means 52 to effect a hybrid control or continuously-variable shifting control, and enables a step-variable shifting control means 54 to effect a predetermined step-variable shifting control. Where the step-variable shifting control means 54 effects the step-variable shifting control according to the determination made on the basis of the relationship of FIG. 8, the step-variable shifting control means 54 effects an automatic shifting control according to a stored predetermined shift boundary data map. Where the determination is made on the basis of the relationship of FIG. 9, the automatic shifting control is effected according to the shift boundary data map shown in FIG. 9.

FIG. 2 indicates the combinations of the operating states of the hydraulically operated frictional coupling devices C0, C1, C2, B0, B1, B2 and B3, which are selectively engaged for effecting the step-variable shifting control. In this automatic step-variable shifting control mode, the first-speed through fourth-speed positions are established by an engaging action of the switching clutch C0, and the power distributing mechanism 16 functions as an auxiliary transmission having a fixed speed ratio of γ0 equal to "1". On the other hand, the fifth-speed position is established by an engaging action of the switching brake B0 in place of the switching clutch C0, and the power distributing mechanism 16 functions as an auxiliary transmission having a fixed speed ratio γ0 equal to about 0.7, for example. That is, the drive system 10 as a whole including the power distributing mechanism 16 functioning as the auxiliary transmission and the automatic transmission 20 functions as a so-called "automatic transmission", in the automatic step-variable shifting control mode.

The drive-force-related value indicated above is a parameter corresponding to the drive force of the vehicle, which may be an output torque $T_{OUT}$ of the automatic transmission 20, an engine output torque $T_E$, or an acceleration value of the vehicle, as well as a drive torque or drive force of drive wheels 38. The engine output torque $T_E$ may be an actual value calculated on the basis of the operating angle of the accelerator pedal or the opening angle of the throttle valve (or intake air quantity, air/fuel ratio or amount of fuel injection) and the engine speed $N_E$, or an estimated value of the required vehicle drive force which is calculated on the basis of the amount of operation of the accelerator pedal by the vehicle operator or the operating angle of the throttle valve. The vehicle drive torque may be calculated on the basis of not only the output torque $T_{OUT}$, etc., but also the ratio of a differential gear device and the radius of the drive wheels 38, or may be directly detected by a torque sensor or the like.

When the switching control means 50 determines that the vehicle condition is in the continuously-variable shifting region, on the other hand, the switching control means 50 commands the hydraulic control unit 42 to release both of the switching clutch C0 and the switching brake B0 for placing the power distributing mechanism 16 in the electrically established continuously-variable shifting state. At the same time, the switching control means 50 enables the hybrid control means 52 to effect the hybrid control, and commands the step-variable shifting control means 54 to select and hold a predetermined one of the gear positions, or to permit an automatic shifting control according to the stored predetermined shift boundary data map. In the latter case, the variable-step shifting control means 54 effects the automatic shifting control by suitably selecting the combinations of the operating states of the frictional coupling devices indicated in the table of FIG. 2, except the combinations including the engagement of the switching clutch C0 and brake B0. Thus, the power distributing mechanism 16 placed in the continuously-variable shifting state under the control of the switching control means 50 functions as the continuously variable transmission while the automatic transmission 20 connected in series to the power distributing mechanism 16 functions as the step-variable transmission, so that the drive system provides a sufficient vehicle drive force, such that the speed of the rotary motion transmitted to the automatic transmission 20 placed in one of the first-speed, second-speed, third-speed and fourth-gear positions, namely, the rotating speed of the power transmitting member 18 is continuously changed, so that the speed ratio of the drive system when the automatic transmission 20 is placed in one of those gear positions is continuously variable over a predetermined range. Accordingly, the speed ratio of the automatic transmission 20 is continuously variable through the adjacent gear positions, whereby the overall speed ratio γT of the drive system 10 as a whole is continuously variable.

The hybrid control means 52 controls the engine 8 to be operated with high efficiency, so as to establish an optimum proportion of the drive forces which are produced by the engine 8, and the first electric motor M1 and/or the second electric motor M2. For instance, the hybrid control means 52 calculates the output as required by the vehicle operator at the present running speed V of the vehicle, on the basis of the operating amount of the accelerator pedal and the vehicle running speed, and calculate a required vehicle drive force on the basis of the calculated required output and a required amount of generation of an electric energy to be stored. On the basis of the calculated required vehicle drive force, the hybrid control means 52 calculates a desired engine speed and a desired total output, and controls the actual output of the engine 8 and the amount of generation of the electric energy by the first electric motor M1, according to the calculated desired total output and engine speed $N_E$. The hybrid control means 52 is arranged to control the shifting action of the automatic transmission 20, while taking account of the presently selected gear position of the automatic transmission 20, so as to improve the fuel economy of the engine 8. In the hybrid control, the power distributing mechanism 16 is controlled to function as the electrically controlled continuously-variable transmission, for optimum coordination of the engine speed $N_E$ and vehicle speed V for efficient operation of the engine 8, and the rotating speed of the power transmitting member 18 determined by the selected gear position of the automatic transmission portion 20. That is, the hybrid control means 52 determines a target value of the overall speed ratio γT of the transmission mechanism 10 so that the engine 8 is operated according a stored highest-fuel-economy curve that satisfies both of the desired operating efficiency and the highest fuel economy of the engine 8. The hybrid control means 52 controls the speed ratio γ0 of the differential portion 11, so as to obtain the target value of the overall speed ratio γT, so that the overall speed ratio γT can be controlled within a predetermined range, for example, between 13 and 0.5.

The hybrid control means 52 controls an inverter 58 such that the electric energy generated by the first electric motor M1 is supplied to an electric-energy storage device 60 and the second electric motor M2 through the inverter 58. That is, a major portion of the drive force produced by the engine 8 is mechanically transmitted to the power transmitting member 18, while the remaining portion of the drive force is consumed by the first electric motor M1 to convert this portion into the electric energy, which is supplied from the first electric motor M1 to the second electric motor M2 through the inverter 58 and consumed by the second electric motor M2, or supplied from the first electric motor M1 to the electric-energy storage device 60 through the inverter 58 and subsequently consumed by the first electric motor M1. A drive force produced by an operation of the second electric motor M2 or first electric motor M1 with the electric energy generated by the first electric motor M1 is transmitted to the power transmitting member 18. Thus, the transmission mechanism 10 is provided with an electric path through which an electric energy generated by conversion of a portion of a drive force of the engine 8 is converted into a mechanical energy. This electric path includes components associated with the generation of the electric energy and the consumption of the generated electric energy by the second electric motor M2. The hybrid control means 52 can establish a motor-drive mode to drive the vehicle by utilizing the electric CVT function of the power distributing mechanism 16, irrespective of whether the engine 8 is in the non-operated state or in the idling state.

In the above-described arrangements of the switching control means 50, hybrid control means 52 and step-variable shifting control means 54, the power distributing mechanism 16 is placed in the continuously-variable shifting state, assuring a high degree of fuel economy of the vehicle, when the vehicle is in a low- or medium-speed running state or in a low- or medium-output running state, with the engine operated in the normal output state. When the vehicle is in a high-speed running state or at a high speed of operation of the engine 8, on the other hand, the power distributing mechanism 16 is placed in the fixed-speed-ratio shifting state in which the output of the engine 8 is transmitted to the drive wheels 38 primarily through the mechanical power transmitting path, so that the fuel economy is improved owing to reduction of a loss of conversion of the mechanical energy into the electric energy. When the engine 8 is in a high-output state, the power distributing mechanism 16 is placed in the fixed-speed-ratio shifting state. Thus, the power distributing mechanism 16 is placed in the continuously-variable shifting state, only when the vehicle speed or output is relatively low or medium, so that the required amount of electric energy generated by the first electric motor M1, that is, the maximum amount of electric energy that must be transmitted from the first electric motor M1 can be reduced, whereby the required electrical reaction force of the first electric motor M1 can be reduced, making it possible to minimize the required sizes of the first and second electric motors M1, M2, and the required size of the drive system 10 including the electric motors.

Figure 10:
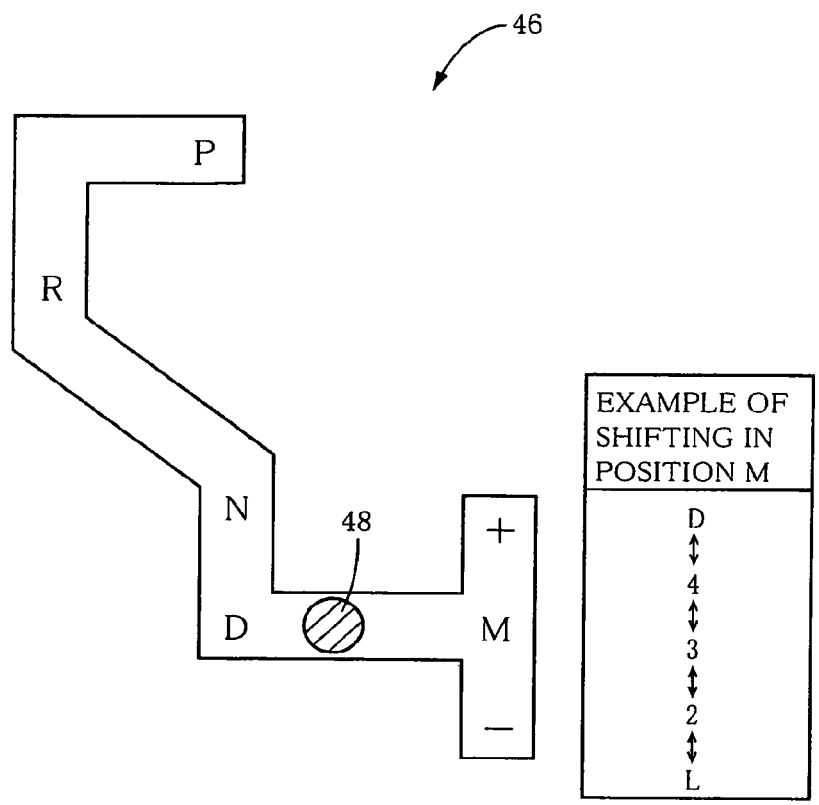
FIG. 10 is a view illustrating a manually operable shifting device including a shift lever, which is used to select one of a plurality of gear positions of the drive system.

FIG. 10 shows an example of a manually operable shifting device in the form of a shifting device 46. The shifting device 46 includes a shift lever 48, which is disposed laterally adjacent to an operator's seat, for example, and which is manually operated to select one of a plurality of positions consisting of a parking position P for placing the drive system 10 (namely, automatic transmission 20) in a neutral state in which a power transmitting path is disconnected with both of the switching clutch C0 and brake B0 placed in the released state, and at the same time the drive system output shaft 22 of the automatic transmission 20 is in the locked state; a reverse-drive position R for driving the vehicle in the rearward direction; a neutral position N for placing the drive system 10 in the neutral state; an automatic forward-drive shifting position D; and a manual forward-drive shifting position M. The parking position P and the neutral position N are non-driving positions selected when the vehicle is not driven, while the reverse-drive position R, and the automatic and manual forward-drive shifting positions D, M are driving positions selected when the vehicle is driven. The automatic forward-drive shifting position D provides a highest-speed position, and positions "4" through "L" selectable in the manual forward-drive shifting position M are engine-braking positions in which an engine brake is applied to the vehicle.

The manual forward-drive shifting position M is located at the same position as the automatic forward-drive shifting position D in the longitudinal direction of the vehicle, and is spaced from or adjacent to the automatic forward-drive shifting position D in the lateral direction of the vehicle. The shift lever 48 is operated to the manual forward-drive shifting position M, for manually selecting one of the positions "D" through "L". Described in detail, the shift lever 48 is movable from the manual forward-drive shifting position M to a shift-up position "+" and a shift-down position "−", which are spaced from each other in the longitudinal direction of the vehicle. Each time the shift lever 92 is moved to the shift-up position "+" or the shift-down position "−", the presently selected position is changed by one position. The five positions "D" through "L" have respective different lower limits of a range in which the overall speed ratio γT of the drive system 10 is aut6omatically variable, that is, respective different lowest values of the overall speed ratio γT which corresponds to the highest output speed of the drive system 10. Namely, the five positions "D" through "L" select respective different numbers of the speed positions or gear positions of the automatic transmission 20 which are automatically selectable, so that the lowest overall speed ratio γT available is determined by the selected number of the selectable gear positions. The shift lever 48 is biased by biasing means such as a spring so that the shift lever 48 is automatically returned from the shift-up position "+" and shift-down position "−" back to the manual forward-drive shifting position M. The shifting device 46 is provided with shift-position sensors operable to detect the presently selected position of the shift lever 48, so that signals indicative of the presently selected operating position of the shift lever 48 and the number of shifting operations of the shift lever 48 in the manual forward-shifting position M are supplied to the electronic control device 40.

When the shift lever 46 is operated to the automatic forward-drive shifting position D, the switching control means 50 effects an automatic switching control of the drive system 10, and the hybrid control means 52 effects the continuously-variable shifting control of the power distributing mechanism 16, while the step-variable shifting control means 54 effects an automatic shifting control of the automatic transmission 20. When the drive system 10 is placed in the step-variable shifting state, for example, the shifting action of the drive system 10 is automatically controlled to select an appropriate one of the first-gear position through the fifth-gear position indicated in FIG. 2. When the drive system 10 is placed in the continuously-variable shifting state, the speed ratio of the power distributing mechanism 16 is continuously changed, while the shifting action of the automatic transmission 20 is automatically controlled to select an appropriate one of the first-gear through fourth-gear positions, so that the overall speed ratio γT of the drive system 10 is controlled so as to be continuously variable within the predetermined range. The automatic forward-drive position D is a position selected to establish an automatic shifting mode (automatic mode) in which the drive system 10 is automatically shifted.

When the shift lever 48 is operated to the manual forward-drive shifting position M, on the other hand, the shifting action of the drive system 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the positions "D" through "L". When the drive system 10 is placed in the step-variable shifting state, for example, the shifting action of the drive system 10 is automatically controlled within the above-indicated predetermined range of the overall speed ratio γT. When the drive system 10 is placed in the continuously-variable shifting state, the speed ratio of the power distributing mechanism 16 is continuously changed, while the shifting action of the automatic transmission 20 is automatically controlled to select an appropriate one of the gear positions the number of which is determined by the manually selected one of the positions "D" through "L", so that the overall speed ratio γT of the drive system 10 is controlled so as to be continuously variable within the predetermined range. The manual forward-drive position M is a position selected to establish a manual shifting mode (manual mode) in which the selectable gear positions of the drive system 10 are manually selected.

Figure 11:
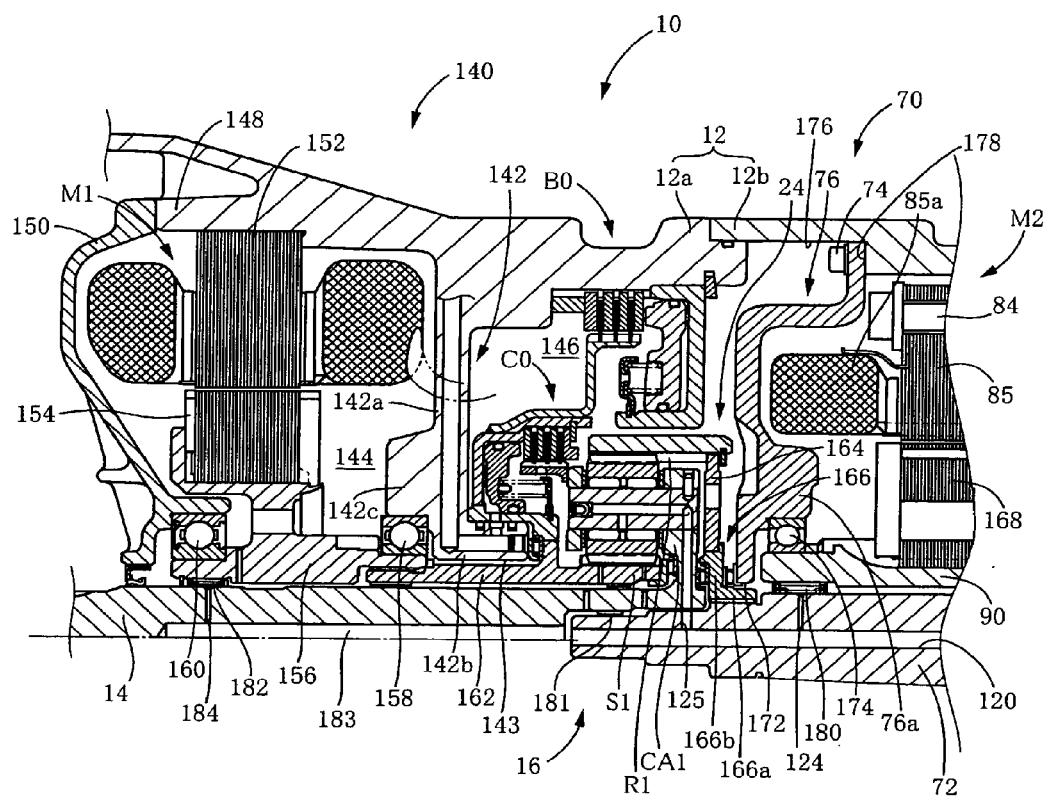
FIG. 11 is a fragmentary cross sectional view of the drive system of FIG. 1.
Figure 12:
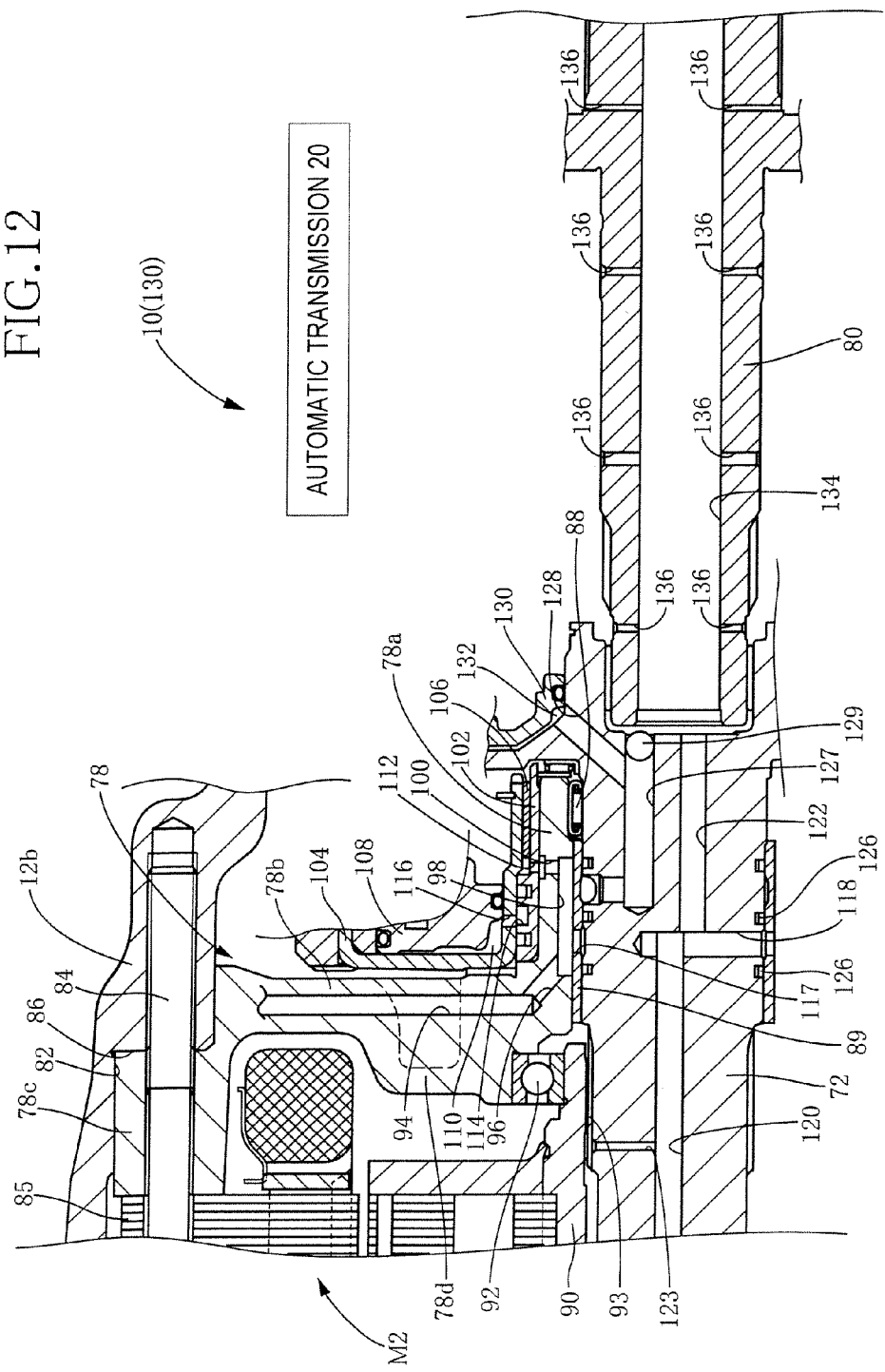
FIG. 12 is a fragmentary cross sectional view of the drive system of FIG. 1.

FIGS. 11 and 12 are fragmentary cross sectional view of the drive system 10, respectively. Referring first to FIG. 11, there will be briefly described an arrangement shown therein. As shown in FIG. 11, the casing 12 of the drive system 10 consists of a first casing 12*a* accommodating the first electric motor M1 and the power distributing mechanism 16, and a second casing 12*b* accommodating the second electric motor M2 and the automatic transmission 20 (not shown in FIG. 11). After the first casing 12*a* and the second casing 12*b* are fixed to each other, the first electric motor M1, the power distributing mechanism 16, the second electric motor M2 are arranged in this order of description in the right direction away from the engine. The first casing 12*a* cooperates with the first electric motor M1 and the power distributing mechanism 16 which are accommodated in the first casing 12*a*, to constitute a first unit 140, while the second casing 12*b* cooperates with the second electric motor 2 and the automatic transmission 20 which are accommodated in the second casing 12*b*, to constitute a second unit 70. The differential mechanism input shaft 14, and the transmission input shaft 72 which is the input shaft of the automatic transmission 20 are disposed coaxially with the axis of the casing 12, such that the differential mechanism input shaft 72 is located on the left side of the transmission input shaft 72. The differential mechanism input shaft 14 is a member corresponding to the first unit 140, while the transmission input shaft 72 is a member corresponding to the second unit 70.

The first casing 12*a* has an integrally formed first support wall 142 located between the first electric motor M1 and the power distributing mechanism 16, while a second support wall 76 is fixed to the second casing 12*b* such that the second support wall 76 is located between the power distributing mechanism 16 and the second electric motor M1.

Referring next to FIG. 12, there is disposed a third support wall 78 on one side (on the right side) of the second electric motor M2 which is remote from the first electric motor M1. On this third support wall 78, there is disposed the automatic transmission 20 such that the automatic transmission 20 is located on one side of the third support wall 78 which is remote from the second electric motor M2. One end portion of an intermediate shaft 80 disposed coaxially with the differential mechanism input shaft 14 and the transmission input shaft 72 is fitted in one end portion of the transmission input shaft 72 which is remote from the differential mechanism input shaft 14, such that the intermediate shaft 80 and the transmission input shaft 72 are rotatable relative to each other. The intermediate shaft 80 is connected at the other end (not shown) to the drive system output shaft 22 (not shown in FIG. 12).

The third support wall 78 consists of an inner cylindrical portion 78*a* coaxial with the transmission input shaft 72; a connecting portion 78*b* which is fixed at its radially inner end to the axial end of the inner cylindrical portion 78*a* on the side of the second electric motor M2 and which extends radially outwardly from the inner cylindrical portion 78*a*; an outer cylindrical portion 78*c* which is connected at its one axial end to the radially outer end of the connecting portion 78*b* and which axially extends toward the second electric motor M2 and has a comparatively large radial wall thickness; and a protruding portion 78*d* which extends toward the second electric motor M2 from a relatively radially inner portion of the side surface of the connecting portion 78*b* that faces the second electric motor M2. The third support wall 78 and the second casing 12*b* constitute a faucet joint. Namely, the outer circumferential surface of the outer cylindrical portion 78*c* is held in abutting contact with a first abutting surface 82 of the inner circumferential surface of the second casing 12*b*. Before the third support wall 78 is fixed to the second casing 12*b* by bolts 84, the outer cylindrical portion 78*c* is slidable at its outer circumferential surface on the first abutting surface 82, so that the third support wall 78 can be fitted into the second casing 12*b*, without a press fit. The third support wall 78 is fitted into the second casing 12*b* after the intermediate shaft 80, components of the automatic transmission 20 and the transmission input shaft 72 are assembled into the second casing 12*b*. Subsequently, the third support wall 78 is fixed to the second casing 12*b* by the bolts 84, together with a stator 85 of the second electric motor M2.

The outer cylindrical portion 78*c* has an axial end face remote from the second electric motor M2. This axial end face is held in abutting contact with a first radial surface 86 of the second casing 12*b*, which first radial surface 86 extends radially inwardly from the axial end of the first abutting surface 82 which is remote from the second electric motor M2. Accordingly, the third support wall 78 can be accurately positioned in its axial and radial directions, by simply fitting the third support wall 78 into the second casing 12*b* until the outer circumferential surface and the above-indicated axial end face of the outer cylindrical portion 78*c* come into in abutting contact with the first abutting surface 82 and the first radial surface 86, respectively. The axial end portion of the transmission input shaft 72 is supported at its axial end portion on the side of the intermediate shaft 80, by the inner cylindrical portion 78a of the third support wall 78 via a bearing 88 fitted in the axial end portion of the inner cylindrical portion 78a remote from the second electric motor M2, such that the transmission input shaft 72 is rotatable relative to the inner cylindrical portion 78a of the third support wall 78. An inner sleeve 89 is fitted in the inner cylindrical portion 78a.

A rotor support shaft 90 of the second electric motor M2 is supported by the third support wall 78 at its axial end portion on the side of the third support wall 78, via a bearing 92 fitted in the protruding portion 78d of the third support wall 78. This rotor support shaft 90 is fitted on the transmission input shaft 72 through a spline 93, so that the rotor support shaft 90 is rotated with the transmission input shaft 72. A stator 85 of the second electric motor M2 is held in abutting contact with an axial end face of the outer cylindrical portion 78c of the third support wall 78. That is, the outer cylindrical portion 78c is interposed between the stator 85 and the second casing 12b, so that the stator 85 is positioned in its axial direction. Thus, the outer cylindrical portion 78c of the third support wall 78 functions as a spacer disposed between the stator 85 and the second casing 12b, and the third support wall 78 is considered to have the integrally formed spacer. The stator 85 and the third support wall 78 are fastened together to the second casing 12b by the above-described bolts 84 extending through the stator 85 and the outer cylindrical portion 78c of the third support wall 78 in the axial direction. Accordingly, the drive system 10 can be more easily assembled, with the reduced number of the required components, and the radial dimension of the drive system 10 can be made smaller, than in the case where the stator 85 and the third support wall 78 are fixed to the second casing 12b, by respective two sets of bolts.

The third support wall 78 described above has first oil passages in the form of a 1-1 oil passage 94, a 1-2 oil passage, a 1-3 oil passage and a 1-4 oil passage to which a lubricating oil is supplied from a secondary regulator valve not shown. The 1-1 oil passage 94 is formed through the connecting portion 78b, so as to extend in the radial direction, and is held at its one end in communication with one end of the 1-2 oil passage 96. The 1-2 oil passage 96 is held at its other end in communication with one end of the 1-3 oil passage 98. The 1-3 oil passage 98 is formed in the inner circumferential surface of the inner cylindrical portion 78a, so as to extend in the axial direction of the inner cylindrical portion 78a. The 1-4 oil passage 100 is formed so as to extend in the radial direction, and is held at its one end in communication with the other end of the 1-3 oil passage 98 which is remote from the 1-2 oil passage 96, and is open at the other end in the outer circumferential surface of the inner cylindrical portion 78a.

An outer sleeve 102 is press-fitted on the outer circumferential surface of the inner cylindrical portion 78a, and a clutch cylinder 104 of the second clutch C2 is fitted on the outer circumferential surface of the outer sleeve 102. A bushing 107 is interposed between the clutch cylinder 104 and the outer circumferential surface of the axial end portion of the outer sleeve 102 which is remote from the connecting portion 78b. The clutch cylinder 104 accommodates a clutch piston 108 such that the clutch piston 108 and the clutch cylinder 104 cooperate to define an oil chamber 110 therebetween.

The outer sleeve 102 has an oil hole 112 formed therethrough in its radial direction such that the oil hole 112 is held in communication with the above-indicated 1-4 oil passage 100. The lubricating oil is fed to the oil hole 112 through the 1-1 oil passage 94, 1-2 oil passage 96, 1-3 oil passage 98 and 1-4 oil passage 100, and is further fed through an oil hole formed through the clutch cylinder 104, to lubricate friction plates (not shown) of the second clutch C2. The outer sleeve 102 further has an oil groove 114 for supplying the oil chamber 110 with a working oil. This oil groove 114 is held in communication with working oil passages (not shown) formed through the third support wall 78, in addition to the oil passages 94, 96, 98, 100. The clutch cylinder 104 has an oil hole 116 for communication between the oil groove 114 and the oil chamber 110.

The above-indicated inner sleeve 89 is fitted on the inner cylindrical portion 78a of the third support wall 78, so as to partially define the 1-3 oil passage 98, and has an oil hole 117 formed therethrough in its radial direction. the oil hole 117 is open at its one end in an end portion of the 1-3 oil passage 98 which is on the side of the second electric motor M2.

The transmission input shaft 72 has second oil passages in the form of a 2-1 oil passage 118, a 2-2 oil passage 120, a 2-3 oil passage 122, a 2-4 oil passage 123, a 2-5 oil passage 124 (shown in FIG. 11) and a 2-6 oil passage 125 (shown in FIG. 11), which serve as lubricating oil passages. The 2-1 oil passage 118 is formed so as to extend in the radial direction, and is held in communication with the 1-3 oil passage 98 through the oil hole 117 formed through the inner sleeve 89. The 2-2 oil passage 120 is formed so as to extend in the axial direction, and is held at its one end in communication with the 2-1 oil passage 118 and is open at its other end in the end face of the transmission input shaft 72 on the side of the differential mechanism input shaft 14. The 2-2 oil passage 120 is supplied with the lubricating oil through the 1-1 oil passage 94, 1-2 oil passage 96, 1-3 oil passage 98, oil hole 117 and 3-2 oil passage 118. The 2-3 oil passage 122 is formed so as to extend in the axial direction, and is held at its one end in communication with the 2-1 oil passage 118 and is open at its other end in the end face of the transmission input shaft 72 on the side of the intermediate shaft 80. The 2-4 oil passage 123 is formed so as to extend in the radial direction, and is held at its one end in communication with the 2-2 oil passage 120 and is open at its other end in a portion of the outer circumferential surface of the transmission input shaft 72 in which the spline 93 is formed. The lubricating oil fed to the 2-4 oil passage 123 through the 2-2 oil passage 120 is further fed through the spline 93, to lubricate the bearing 92. It is noted that although sealing rings 126 are fitted on the outer circumferential surface of the transmission input shaft 72, at respective axial positions on the respective opposite sides of the 2-1 oil passage 118, the amount of a dragging power loss of the transmission input shaft 72 due to friction with respect to the sealing rings 126 during rotation of the transmission input shaft 72 is comparatively small, since the sealing rings 126 fitted on the transmission input shaft 72 have a comparatively small diameter.

The transmission input shaft 72 further have working oil passages such as a first working oil passage 127 and a second working oil passage 128, in addition to the above-described oil passages 118, 120, 122, 123, 124 and 125. The first working oil passage 127 is formed in the axial direction, in parallel with the 2-3 oil passage 122, and is open at its one end in the end face of the transmission input shaft 72 on the side of the intermediate shaft 80, like the 2-3 oil passage 122. Accordingly, the 2-3 oil passage 122 and the first working oil passage 127 can be formed simultaneously. The open end of the first working oil passage 127 is fluid-tightly closed by a ball 129. The second working oil passage 128 is open at its one end in an oil chamber 132 formed in the back surface of a clutch piston 130 of the first clutch C1.

The intermediate shaft 80 fitted in the transmission input shaft 72 rotatably relative to the transmission input shaft 72 has an axial lubricating oil passage 134 which is held at its one end in communication with the open end of the 2-3 oil passage 122. The intermediate shaft 80 further has a plurality of radial lubricating oil passages 136 for communication between the axial lubricating oil passage 134 and the outer circumferential surface of the intermediate shaft 80. The lubricating oil is fed to the various components of the automatic transmission 20 through the above-indicated 1-1 oil passage 94, 1-2 oil passage 96, 1-3 oil passage 98, oil hole 117, 2-1 oil passage 118, 2-3 oil passage 122, axial lubricating oil passage 134 and radial lubricating oil passages 136.

There will next be described in detail the construction shown in FIG. 11. The first casing 12a has a generally cylindrical outer shape. An axial portion of the first casing 12a which accommodates the power distributing mechanism 16 has a substantially constant outside diameter, while an axial portion of the first casing 12a of the first casing 12a which accommodates the first electric motor M1 increases in the axial direction toward the engine 8 (in the left direction as seen in FIG. 11). The first casing 12a are open at its opposite axial ends, and has the above-indicated first support wall 142 integrally formed between the power distributing mechanism 16 and the first electric motor M1. The first support wall 142 includes an upright portion 142a in the form of a disc extending perpendicularly to the differential mechanism input shaft 14, a cylindrical portion 142b which is fixed at its one axial end to the radially inner end of the upright portion 142a and which extends toward the first planetary gear set 24, and a protruding portion 142c protruding in the axial direction toward the first electric motor M1, from the side surface of a radially inner portion of the upright portion 142a, which side surface faces the first electric motor M1. The cylindrical portion 142b has a radially central through-hole 143 formed therethrough in its axial direction. The interior of the first casing 12a is divided by the first support wall 142 into a first accommodating space 144 which is formed on the side of the engine 8 and which accommodates the first electric motor M1, and a second accommodating space 146 which accommodates the power distributing mechanism 16. The first electric motor M1 is installed in the first accommodating space 144 through the left axial open end of the first casing 12a, while the power distributing mechanism 16 is installed in the second accommodating space 146 through the right axial open end of the first casing 12a, as seen in FIG. 11.

The first casing 12a includes an annular projecting portion 148 extending in the axial direction coaxially with the differential mechanism input shaft 14, such that the projecting portion 148 partially defines the first accommodating space 144 having a substantially constant diameter. A lid plate 150 is fixed to the first casing 12a, such that the lid plate 150 is held at its radially outer end in contact with the end face of the projecting portion 148.

The first electric motor M1 consists of a stator 152, a rotor 154, and a rotor support shaft (rotor hub) 156 formed integrally with the rotor 154. The above-described first support wall 142 functions as a support member, and the rotor support shaft 156 is supported at its one axial end portion via a bearing 158, by the inner circumferential surface of the protruding portion 142c of the first support wall 142, which is a portion of the first casing 12a, such that the rotor support shaft 156 is rotatable relative to the protruding portion 142c. The rotor support shaft 156 is supported at its other axial end portion by the first casing 12a, through a bearing 160 and the lid plate 150 fixed to the first casing 12a, such that the rotor support shaft 156 is rotatable relative to the first casing 12a.

A sun gear shaft 162 formed integrally with the first sun gear S1 extends at its one axial end portion through the above-described through-hole 143, that is, through the cylindrical portion 142b of the first support wall 142, into the axial end portion of the rotor support shaft 156 on the side of the first support wall 142. The differential mechanism input shaft 14 is aligned with the axis of the first casing 12a, which is radially inward of the rotor support shaft 156 and the sung ear shaft 162, such that the input shaft 14 is rotatable relative to those rotor support shaft 156 and the sun gear shaft 162. The differential mechanism input shaft 14 is integrally fixed at its one axial end to the first carrier CA1, so that the output of the engine 8 (not shown in FIG. 11) is transmitted to the first carrier CA1 through the differential mechanism input shaft 14.

An annular plate 164 is fixed to the inner circumferential surface of an axial end portion of the first ring gear R1 of the first planetary gear set 25, which axial end portion is located on the side of the second unit 70, such that the annular plate 164 is not movable relative to the first ring gear R1 in the axial and circumferential direction. This annular plate 164 is perpendicular to the axis of the differential mechanism input shaft 14, and has a central bore. An output shaft 166 of the first planetary gear set 24 (that is, the output shaft of the power distributing mechanism 16) has a shaft portion 166a in the form of a sleeve extending toward the second unit 70, and a flange portion 166b which extends radially from the axial end of the shaft portion 166a on the side of the first planetary gear set 24. This flange portion 166b is welded to the annular plate 164, so that the output shaft 166 and the annular plate 164 are rotated as a unit. It is noted that the output shaft 166 functions as the power transmitting member 18 shown in FIG. 1. It is also noted that the switching clutch C0 is disposed between the first support wall 142 and the first planetary gear set 24, while the switching brake B0 is disposed radially outwardly of the first planetary gear set 24.

The second electric motor M2 includes the above-indicated stator 84, a rotor 168, and the above-indicated rotor support shaft 90 rotating with the rotor 168. The second support wall 76 disposed on one side of the second electric motor M2 on the open end side of the second casing 12b (on the side of the first casing 12a) has a radially central through-hole 172 formed therethrough in its axial direction. The second support wall 76 has a protruding portion 76a which is located radially inwardly of a stator coil 85a of the stator 85 and which axially extends towards the rotor 168 A bearing 174 is fitted in the inner circumferential surface of the protruding portion 76a.

The second support wall 76 and the second casing 12b also cooperate to constitute a faucet joint. Namely, the outer circumferential surface of the second support wall 76 is held in abutting contact with a second abutting surface 176 of the inner circumferential surface of the second casing 12b. The second abutting surface 176 is nearer to the axial open end of the second casing 12b, than the above-indicated first abutting surface 82, and is radially outwards of the first abutting surface 82. Before the second support wall 76 is fixed to the second casing 12b by bolts 74, the second support wall 76 is slidable at its outer circumferential surface on the second abutting surface 176. Further, the side surface of the radially outer end portion of the second support wall 76, which is on the side of the second electric motor M2, is held in abutting contact with a second radial surface 178 of the second casing 12b, which second radial surface 178 radially extends from one axial end of the second abutting surface 176 on the side of the second electric motor M2. Accordingly, the second support wall 76 can be accurately positioned in its axial and radial directions, by simply fitting the second support wall 76 into the second casing 12b until the outer circumferential surface and the side surface of the second support wall 76 come into abutting contact with the second abutting surface 176 and the second radial surface 178 of the second casing 12*b*, respectively.

The rotor support shaft 90 is supported at its one axial end portion by the second support wall 76 via the above-indicated bearing 174. Further, the rotor support shaft 80 supports, at its axial end portion on the side of the second support wall 76, the transmission input shaft 72 via a bearing 180 disposed radially inwardly of the above-indicated bearing 174. That is, the axial end portion of the transmission input shaft 72 on the side of the second support wall 76 is supported by the second support wall 76 via the bearing 180, rotor support shaft 90 and baring 174, and can be accurately positioned in its radial direction since the second support wall 76 can be accurately positioned in its radial direction, as described above. Further, the other axial end portion of the transmission input shaft 72 is supported by the third support wall 78 accurately positioned in its radial direction, so that this other axial end portion can be accurately positioned in its radial direction, whereby the transmission input shaft 72 can be accurately positioned in its radial direction.

The transmission input shaft 72 extends through the above-indicated through-hole 172 toward the first unit 140, and is splined to the output shaft 166 of the first planetary gear set 24, at an axial portion corresponding to the through-hole 172. The above-indicated 2-5 oil passage 124 is formed so as to extend in the radial direction, and is held at its one end in communication with the 2-2 oil passage 120 and open at its other end in the outer circumferential surface of the transmission input shaft 72, at an axial position at which the above-indicated bearing 180 is located. The lubricating oil fed to the 2-5 oil passage 124 through the 2-2 oil passage 120 is further fed to the above-indicated bearing 180 and to the bearing 174 located radially outwardly of the bearing 180.

The axial end portion of the transmission input shaft 72 on the side of the first unit 140 extends into the axial end portion of the differential mechanism input shaft 14 on the side of the second unit 70, which is supported by the transmission input shaft 72 via a bushing 181 which is located radially inwardly of the first sun gear S1 and which is interposed between the differential mechanism input shaft 14 and the transmission input shaft 72. The transmission input shaft 72 is supported by the second casing 12*b* via the bearing 180, rotor support shaft 90, bearing 174 and second support wall 76, so that the axial end portion of the differential input shaft 14 on the side of the second unit 70 is supported by the second casing 12*b* via the above-indicated members 181, 72, 180, 90, 174, 76. Further, the differential mechanism input shaft 14 is supported by the rotor support shaft 156 via the bearing 182 which is interposed between the differential mechanism input shaft 14 and the inner circumferential surface of the axial end portion of the rotor support shaft 156 on the side of the lid plate 150. The rotor support shaft 156 is supported by the first casing 12*a* via the bearing 160 and the lid plate 150, so that the differential mechanism input shaft 14 is supported by the first casing 12*a* via the above-indicated members 182, 156, 160 and 150. Thus, the differential mechanism input shaft 14 is supported by the casing 12 at its two axial portions, which are spaced from each other in the axial direction by a comparatively large distance, so that the differential mechanism input shaft 14 can be accurately positioned in its radial direction. As described above, the differential mechanism input shaft 14 supported at its one axial end portion by the transmission input shaft 72 can be accurately aligned with the transmission input shaft 72 in the radial direction.

The differential mechanism input shaft 14 has third oil passages in the form of a radially central 3-1 oil passage 183 which is open at its one axial end toward the 2-2 oil passage 120, and a 3-2 oil passage 184 which is held at its axial end in communication with the 3-1 oil passage 183 and open at its other axial end in the outer circumferential surface of an axial portion of the differential mechanism input shaft 14 on which the bearing 182 is fitted. The lubricating oil is fed to the 3-1 oil passage 183 through the 2-2 oil passage 120, and is further fed from the 3-1 oil passage 183 to the 3-2 oil passage 184, to lubricate the bearings 182, 160. It is noted that the above-indicated bushing 181 functioning as a lubricant sealing member assures a sufficient amount of supply of the lubricating oil from the 2-2 oil passage 120 to the 3-1 oil passage 183, without an additional sealing member.

Figure 13:
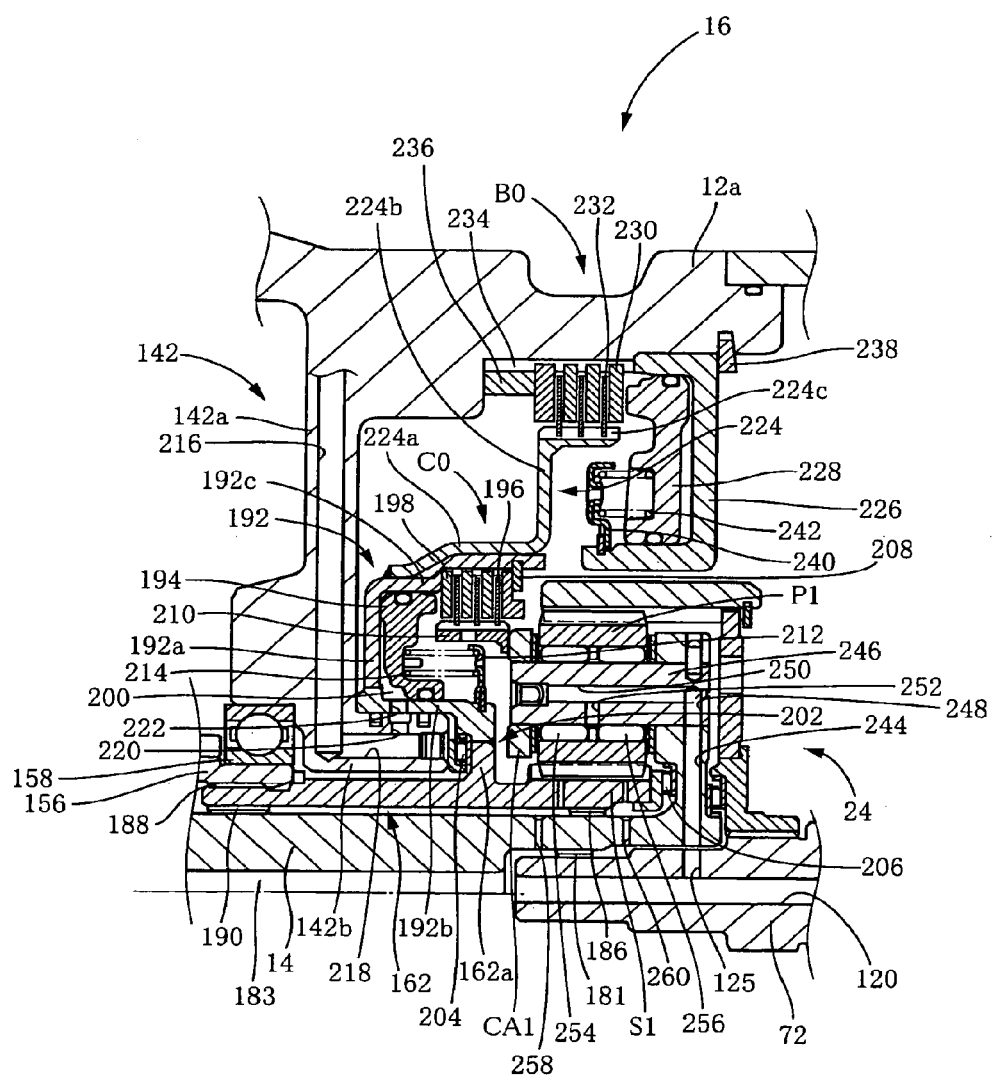
FIG. 13 is an enlarged view of the power distributing mechanism of FIG. 11.

FIG. 13 is a fragmentary view showing in enlargement the power distributing mechanism 16 shown in FIG. 11. The first sun gear S1 is supported by the differential mechanism input shaft 14 via a bushing 186 interposed between the first sun gear S1 and the differential mechanism input shaft 14. The other axial end portion of the sun gear shaft 162 formed integrally with the first sun gear S1 extends into the rotor support shaft 156, as described above, and the rotor support shaft 156 and the sun gear shaft 162 are fitted on each other through a spline portion 188 and rotated as a unit. A bushing 190 is interposed between the differential mechanism input shaft 14 and the inner circumferential surface of an axial portion of the sun gear shaft 162 which corresponds to the spline portion 188. The sun gear shaft 162 is supported at its axial end portion on the side of the spline portion 188, by the differential mechanism input shaft 14 via the bushing 190. Accordingly, the sun gear shaft 162 formed integrally with the first sun gear S1 is supported by the differential mechanism input shaft 14, at its two axial portions via the bushings 186, 190. Since the differential mechanism input shaft 14 is positioned accurately in its radial direction, as described above, the first sun gear S1 and the sun gear shaft 162 can also be accurately positioned in their radial direction.

The switching clutch C0 includes: a clutch cylinder 192 fitted on the above-indicated cylindrical portion 142*b* of the first support wall 142; a clutch piston 194 accommodated in the clutch cylinder 192; a plurality of pressure plates 196 and a plurality of friction discs 198 which are forced against each other by the clutch piston 194. The clutch cylinder 192 includes: a bottom portion 192*a* extending in parallel with the upright portion 142*a* of the first support wall 142: an inner cylindrical portion 192*b* fixed to the radially inner end of the bottom portion 192*a* and fitted on the cylindrical portion 142*b* of the first support wall 142; and an outer cylindrical portion 192*c* fixed to the radially outer end of the bottom portion 192*a*. The clutch piston 194 is accommodated in the clutch cylinder 192 such that the bottom portion 192*a* of the clutch cylinder 192 cooperates with the clutch piston 194 to define therebetween an oil chamber 200.

The sun gear shaft 162 has a flange portion 162*a* which radially extends toward the inner cylindrical portion 192*b* of the clutch cylinder 192 and which has an outer circumferential surface located radially outwardly of that of the first sun gear S1. The inner circumferential surface of the inner cylindrical portion 192*b* of the clutch cylinder 192 which is a member of the switching clutch C0, and the outer circumferential surface of the flange portion 162*a* of the sun gear shaft 162 are welded together at a weld portion 202. Thus, the first sun gear S1 formed integrally with the sun gear shaft 162, and the clutch cylinder 192 are integrally formed as a unit. Since the first sun gear S1 and the sun gear shaft 162 are accurately positioned in their radial direction, as described above, the clutch cylinder 192 is also accurately positioned in the radial direction.

A thrust bearing 204 is disposed between one of the side surfaces of the flange portion 162a of the sun gear shaft 162, and the axial end face of the cylindrical portion 142b of the first support wall 142, which end face is opposed to the above-indicated one side surface of the flange portion 162a. A thrust force acting on the first sun gear S1 in the axial direction toward the first electric motor M1 is received by the first support wall 142 through the thrust bearing 204. Since the sun gear shaft 162 and the rotor support shaft 156 are fitted on each other through the spline portion 188, the thrust force acting on the first sun gear S1 in the axial direction toward the first electric motor M1 is not transmitted to the rotor support shaft 156. A thrust force acting on the first sun gear S1 in the axial direction opposite to the axial direction toward the first electric motor M1 is received by the differential mechanism input shaft 14 integral with the first carrier CA1, through a thrust bearing 206 disposed between the opposite side surfaces of the first sun gear S1 and the first carrier CA1.

The above-indicated plurality of pressure plates 196 are splined to the inner circumferential surface of the outer cylindrical portion 192c. A retainer ring 208 is also splined to the inner circumferential surface of the outer cylindrical portion 192c, at an axial position which is nearer to the open end of the clutch cylinder 192, than the pressure plate 196 nearest to the open end. On the other hand, the plurality of friction discs 198 each interposed between the adjacent pressure plates 196 are splined to the outer circumferential surface of a clutch hub 210 which is fixed to the radially outer end portion of the first carrier CA1 and which extends toward the clutch piston 194 in the axial direction of the clutch piston 194. A spring retainer plate 212 is fixed to the outer circumferential surface of the inner cylindrical portion 192b of the clutch cylinder 192, such that the spring retainer plate 212 is located radially inwardly of the clutch hub 210 and in the axial open end portion of the clutch cylinder 192, and extends in the radial direction of the clutch cylinder 192, and such that the spring retainer plate 212 is not movable in the axial direction toward the first planetary gear set 24. A return spring 214 is disposed between the spring retainer plate 212 and the clutch piston 194.

Oil passages are formed through the first support wall 142, for supplying the working oil to the oil chamber 200 of the switching clutch C0 constructed as described above. Described in detail, the upright portion 142a of the first support wall 142 has a first radial oil passage 216, and the cylindrical portion 142b of the first support wall 142 has an axial oil passage 218 which is held at its one axial end in communication with the first radial oil passage 216, and a second radial oil hole 220 which is held at its one axial end in communication with the axial oil passage 218 and open at its other axial end in the outer circumferential surface of the cylindrical portion 142b. Further, the inner cylindrical portion 192b of the clutch cylinder 192 has a third radial oil hole 222 for communication between the above-indicated second radial oil hole 220 and the oil chamber 200. In the present embodiment, the sun gear shaft 162 extends through the cylindrical portion 142b of the first support wall 142 and projects from the cylindrical portion 142b in the axial direction away from the first sun gear S1, and the sun gear shaft 162 and the rotor support shaft 156 are located radially inwardly of the bearing 158 disposed adjacent to the cylindrical portion 142b, and are fitted on each other through the spline 188. In this arrangement, the wall thickness (thickness in the radial direction) of the cylindrical portion 142b can be made larger than in an arrangement wherein the rotor support shaft 156 extends into the cylindrical portion 142b and fitted on the sun gear shaft 162, within the cylindrical portion 142b. Accordingly, the above-indicated axial oil passage 218 and the second radial oil hole 220 can be formed comparatively easily through the cylindrical portion 142b.

A brake hub 224 consists of an inner cylindrical portion 224a fitted on the outer circumferential surface of the outer cylindrical portion 192c of the clutch cylinder 192; a connecting portion 224b which is connected at its radially inner end portion to one axial end portion of the inner cylindrical portion 224a remote from the first support wall 142 and which extends radially outwardly of the inner cylindrical portion 224a; and an outer cylindrical portion 224c which is connected at its one axial end portion to the radially outer end portion of the connecting portion 224b and which extends from the connecting portion 224b in the axial direction away from the inner cylindrical portion 224a. The inner cylindrical portion 224a is welded to the outer cylindrical portion 192c of the clutch cylinder 192, so that the brake hub 224 is fixedly positioned and is rotated with the clutch cylinder 192.

The switching brake B0 has: the above-indicated brake hub 224; a brake cylinder 226 fitted in the first casing 12a; a brake piston 228 accommodated in the brake cylinder 226; and a plurality of pressure plates 230 and a plurality of friction discs 232 which are forced against each other by the brake piston 228.

The upright portion 142a of the first support wall 142 includes a radially outer end portion having a relatively large wall thickness and extending toward the switching brake B0. The inner circumferential surface of the first casing 12a has a spline 234 between the end face of the upright portion 142a of the first support wall 142 which faces the switching brake B0, and the end face of the brake cylinder 26 which faces the first support wall 142. The plurality of pressure plates 230 are splined to the inner circumferential surface of the first casing 12a through the spline 234. A spacer member 236 in the form of a sleeve is interposed between the first support wall 142 and one of the plurality of pressure plates 230 which is nearest to the first support wall 142. On the other hand, the plurality of friction discs 232 are splined to the outer circumferential surface of the outer cylindrical portion 224c of the brake hub 224.

The above-described brake cylinder 226 is prevented from moving in one of the opposite axial directions, in abutting contact with the end faces of the teeth of the spline 234, and in the other axial direction by a retainer spring 238 fixed to the first casing 12a. A spring retainer plate 240 is fixed to the axial open end portion of the brake cylinder 226, so as to extend in the radial direction, such that the spring retainer plate 240 is not axially movable toward the first support wall 142. The return spring 242 is interposed between the spring retainer plate 140 and the brake piston 228.

The 2-5 oil passage 125 formed through the transmission input shaft 72 is open at its one end in the outer circumferential surface of the transmission input shaft 72, at an axial position corresponding to the axial end portion of the differential mechanism input shaft 14 (at which the input shaft 14 is connected to the first carrier CA1). The 2-5 oil passage 125 is held at its other end in communication with the 2-2 oil passage 120. Further, a third oil passage in the form of a 3-3 oil passage 244 is formed so as to extend between the axial end portion of the differential mechanism input shaft 14 which is connected to the first carrier CA1, and the first carrier CA1. The 3-3 oil passage 244 is open at its one end in the inner circumferential surface of the differential mechanism input shaft 14, such that this one end is opposed to the 2-5 oil passage 125. Further, fourth oil passages in the form of a 4-1 oil passage 248, a 4-2 oil passage 250 and a 4-3 oil passage 252 are formed through a pinion shaft 246 fitted in the first carrier CA1. The 4-1 oil passage 248 is formed so as to extend in the radial direction of the pinion shaft 246, and is held at its one end in communication with the 3-3 oil passage 244. The 4-2 oil passage 250 is formed in the axial direction of the pinion shaft 246, and is held at its one end in communication with the 4-1 oil passage 248. The 4-3 oil passage 252 is held at its one end in communication with the 4-2 oil passage 250, and is open at its other end between two needle bearings 254, 256 which are interposed between the pinion shaft 246 and the first planetary gear P1. The lubricating oil is supplied to the differential mechanism in the form of the first planetary gear set 24 through the 2-5 oil passage 125, 4-1 oil passage 248, 4-2 oil passage 250 and 4-3 oil passage 252. The differential mechanism input shaft 14 further has third oil passages in the form of a 3-4 oil passage 258 and a 3-5 oil passage 260 formed therethrough in the axial direction, so that the lubricating oil is supplied to the first planetary gear set 24 also through those 3-4 oil passage 258 and 3-5 oil passage 260. The lubricating oil which has lubricated the first planetary gear set 24 is used to lubricate also the pressure plates 230 and friction discs 232 of the switching brake B0 which is located radially outwardly of the first planetary gear set 24.

In the present embodiment described above, the lubricating oil is supplied from the third support wall 78 between the second electric motor M2 and the automatic transmission 20, to the first electric motor M1, power distributing mechanism 16 and second electric motor M2 which are disposed on one of opposite axial sides of the third support wall 78, and to the automatic transmission 20 which is disposed on the other axial side of the third support wall 78. Accordingly, the arrangement of the lubricating oil passages can be made simpler in the present embodiment, than in the case where two sets of lubricating oil passages are provided for the respective two groups of devices disposed on the respective opposite axial sides of the third support wall 78.

While the preferred embodiment of this invention has been described above by reference to the accompanying drawings, for illustrative purpose only, it is to be understood that the present invention may be embodied with various changes and modifications, as described below.

In the illustrated embodiment, the power distributing mechanism 16 is placed selectively in one of its differential state and non-differential state, so that the drive system 10 is switchable between the continuously-variable shifting state in which the drive system is operable as an electrically controlled continuously-variable transmission, and the step-variable shifting state in which the drive system is operable as a step-variable transmission. However, the switching between the continuously-variable shifting state and the step-variable shifting state is one form of the switching between the differential state and the non-differential state of the power distributing mechanism 16. For instance, the power distributing mechanism 16 may be operated as a step-variable transmission the speed ratio of which is variable in steps, even while the power distributing mechanism 16 is placed in the differential state. In other words, the differential state and the non-differential state of the drive system 10 (power distributing mechanism 16) do not necessarily correspond to the continuously-variable shifting state and the step-variable shifting state, respectively, and the drive system 10 need not be switchable between the continuously-variable shifting state and the step-variable shifting state.

In the power distributing mechanism 16 in the illustrated embodiment, the first carrier CA1 is fixed to the engine 8, and the first sun gear S1 is fixed to the first electric motor M2 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the differential mechanism input shaft 14 in the illustrated embodiment, the engine 8 may be operatively connected to the input shaft 14 through any suitable member such as gears and a belt, and need not be disposed coaxially with the input shaft 14.

Although the power distributing mechanism 16 in the illustrated embodiment is provided with the switching clutch C0 and the switching brake B0, the power distributing mechanism 16 need not be provided with both of the switching clutch C0 and brake B0. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

While the switching clutch C0 is engaged to establish the neutral position N in the drive system 10 in the illustrated embodiment, the switching clutch C0 need not be engaged to establish the neutral position.

The frictional coupling devices used as the switching clutch C0, switching brake B0, etc. in the illustrated embodiment may be replaced by a coupling device of a magnetic-power type, an electromagnetic type or a mechanical type, such as a powder clutch (magnetic powder clutch), an electromagnetic clutch and a meshing type dog clutch.

The drive system 10 according to the illustrated embodiment is a drive system for a hybrid vehicle in which the drive wheels 38 can be driven by not only the engine 8 but also the first electric motor or the second electric motor M2. However, the principle of the present invention is applicable to a vehicular drive system in which the power distributing mechanism 16 is not operable in a hybrid control mode, and functions only as a continuously variable transmission so-called an "electric CVT".

In the illustrated embodiment, the first support wall 142 is formed integrally with the casing 12, while the second support wall 76 and the third support wall 78 are formed separately from the casing 12 and fixed to the casing 12 through the bolts 74, 84. However, it is possible that the first support wall 142 is formed separately from the casing 12 and fixed to the casing 12 through bolts or other fastening means, while the second support wall 76 and the third support wall 78 are formed integrally with the casing 12.

While the power distributing mechanism 16 is constituted by one planetary gear set in the illustrated embodiment, the power distributing mechanism 16 may be constituted by two or more planetary gear sets. In this case, the power distributing mechanism 16 functions as a transmission having three or more gear positions in the fixed-speed-ratio shifting state. Further, the planetary gear set may be replaced by a differential gear device including a pinion rotated by the engine, and a pair of bevel gears meshing with the pinion and operatively connected to the first electric motor M1 and the power transmitting member 18.

The power transmitting device in the form of the automatic transmission 20 in the illustrated embodiment includes the three planetary gear sets 26, 28 and 30. However, the construction of the automatic transmission is not limited to the details of the illustrated embodiment, in the number of the planetary gear sets, the number of the gear positions, and the selective connections of the clutches C and brakes B to the elements of the planetary gear sets. Further, the automatic transmission 20 may be replaced by a speed reducing mechanism including one planetary gear set, as disclosed in JP-2004-116735A, or by a power transmitting device not arranged to change its speed ratio.

It is to be understood that the embodiment described above is given for illustrating the present invention and that the invention may be embodied with various other changes and modifications which may occur to those skilled in the art.

What is claimed is:

1. A vehicular drive system including a first electric motor, a differential mechanism operable to distribute an output of a drive power source to the first electric motor and a power transmitting member, a second electric motor disposed in a power transmitting path between the power transmitting member and a drive wheel, and a transmission portion disposed between the second electric motor and the drive wheel, said first electric motor, said differential mechanism, said second electric motor and said transmission portion being arranged in an axial direction of the vehicular drive system, said vehicular drive system comprising:

one support wall disposed between said second electric motor and said transmission portion and arranged to support one end of said second electric motor;

a first group of oil passages which are formed through said one support wall and through which a lubricating oil is supplied in a first oil path to at least one of said first electric motor, said differential mechanism and said second electric motor, and to said transmission portion;

another support wall supporting the other end of the second electric motor; and an input shaft of the transmission portion and an output portion of the differential mechanism, which are spline-engaged and which together define a second oil path, wherein the transmission portion is disposed at a rear side of the one support wall provided with the first oil support path for supplying lubricant oil thereto, and wherein the first oil path and the second oil path are separate oil paths.

2. The vehicular drive system according to claim 1, wherein the input shaft of said transmission portion extends through a rotor of said second electric motor in an axial direction of the rotor and is fitted to an input shaft of said differential mechanism, said input shaft of the transmission portion has a second group of oil passages to which the lubricating oil is supplied from said first group of oil passages, and the input shaft of said differential mechanism has a third group of oil passages to which the lubricating oil is supplied from said second group of oil passages.

3. The vehicular drive system according to claim 2, wherein said differential mechanism has a fourth groups of oil passages held in communication with said third group of oil passages formed through the input shaft of said differential mechanism.

4. The vehicular drive system according to claim 2, wherein said first group of oil passages includes an oil passage open in an inner circumferential surface of said one support wall.

5. The vehicular drive system according to claim 4, wherein said second group of oil passages includes a 2-1 oil passage which extends in a radial direction of the input shaft of said transmission portion and which is open at an axial position of the input shaft of said transmission portion at which said first group of oil passages is open toward said 2-1 oil passage.

6. The vehicular drive system according to claim 5, wherein said second group of oil passages includes a 2-2 oil passage which extends in an axial direction of the input shaft of said transmission portion and which is held in communication with said 2-1 oil passage, said 2-2 oil passage being open at one end thereof in an end face of the input shaft of said transmission portion, which end face is located on the side of the input shaft of said differential mechanism.

7. The vehicular drive system according to claim 5, wherein said second group of oil passages includes a 2-3 oil passage which extends in an axial direction of the input shaft of said transmission portion and which is held in communication with said 2-1 oil passage, said 2-3 oil passage being open at one end thereof in an end face of the input shaft of said transmission portion, which end face is remote from the input shaft of said differential mechanism.

8. The vehicular drive system according to claim 6, wherein a rotor support shaft supporting the rotor of said second electric motor, and the input shaft of said transmission portion are fitted on each other through a spline, and said second group of oil passages includes a 2-4 oil passage which extends in the radial direction of the input shaft of said transmission portion and which is held in communication with said 2-2 oil passage, said 2-4 oil passage being open in an axial portion of an outer circumferential surface of the input shaft of said transmission portion in which said spline is formed.

9. The vehicular drive system according to claim 6, wherein a bearing is interposed between a rotor support shaft supporting the rotor of said second electric motor, and the input shaft of said transmission portion, and said second group of oil passages includes a 2-5 oil passage which extends in the radial direction of the input shaft of said transmission portion and which is held in communication with said 2-2 oil passage, said 2-5 oil passage being open in an axial portion of an outer circumferential surface of the input shaft of said transmission portion at which said bearing is located.

10. The vehicular drive system according to claim 6, wherein said second group of oil passages includes a 2-6 oil passage which is located radially inwardly of said differential mechanism and which extends in the radial direction of the input shaft of said transmission portion, said 2-6 oil passage being held in communication with said 2-2 oil passage.

11. The vehicular drive system according to claim 6, wherein said third group of oil passages includes a 3-1 oil passage which extends in an axial direction of the input shaft of said differential mechanism and which is open at one end thereof toward said 2-2 oil passage.

12. The vehicular drive system according to claim 11, wherein a bearing is interposed between a rotor support shaft supporting the rotor of said second electric motor, and the input shaft of said differential mechanism, and said third group of oil passages includes a 3-2 oil passage which extends in a radial direction of the input shaft of said differential mechanism and which is held in communication with said 3-1 oil passage, said 3-2oil passage being open in an axial portion of an outer circumferential surface of the input shaft of said differential mechanism at which said bearing is located.

13. The vehicular drive system according to claim 10, wherein an axial end portion of the input shaft of said differential mechanism which is located on the side of said power transmitting member is formed integrally with a portion of said differential mechanism, and said third group of oil passages includes a 3-3 oil passage which is formed through said portion of said differential mechanism, so as to extend in a radial direction of the differential mechanism, said 3-3 oil passage being held in communication with said 2-6 oil passage.

14. The vehicular drive system according to claim 10, wherein an axial end portion of the input shaft of said differential mechanism which is located on the side of said power transmitting member is formed integrally with a portion of said differential mechanism, and said third group of oil passages includes a 3-3 oil passage which is formed through said portion of said differential mechanism, so as to extend in a radial direction of the differential mechanism, said 3-3 oil passage being held in communication with said 2-6 oil passage, and said differential mechanism includes a planetary gear set, and said fourth group of oil passages includes a 4-1 oil passage which is formed through a pinion shaft of said planetary gear set, so as to extend in a radial direction of said pinion shaft, said 4-1 oil passage being held in communication with said 3-3 oil passage, said fourth group of oil passages further including a 4-2 oil passage which is formed through said pinion shaft, so as to extend in an axial direction of the pinion shaft, said 4-2 oil passage being held in communication with said 4-1 oil passage.

15. The vehicular drive system according to claim 1, accommodated in a case including a first case portion accommodating the first electric motor and the differential mechanism and a second case accommodating the second electric motor and the transmission portion.

16. The vehicular drive system according to claim 1, wherein the transmission portion is an automatic transmission.

* * * * *